US011574202B1

(12) United States Patent
Shahrzad et al.

(10) Patent No.: US 11,574,202 B1
(45) Date of Patent: *Feb. 7, 2023

(54) DATA MINING TECHNIQUE WITH DISTRIBUTED NOVELTY SEARCH

(71) Applicant: Cognizant Technology Solutions U.S. Corporation, College Station, TX (US)

(72) Inventors: Hormoz Shahrzad, Dublin, CA (US); Babak Hodjat, Dublin, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 672 days.

This patent is subject to a terminal disclaimer.

(21) Appl. No.: 16/590,209

(22) Filed: Oct. 1, 2019

Related U.S. Application Data

(63) Continuation of application No. 15/146,846, filed on May 4, 2016, now Pat. No. 10,430,709.

(51) Int. Cl.
*G06N 3/12* (2006.01)
(52) U.S. Cl.
CPC ............................... *G06N 3/126* (2013.01)
(58) Field of Classification Search
CPC ....................................................... G06N 3/126
See application file for complete search history.

(56) References Cited

U.S. PATENT DOCUMENTS

| 5,845,266 A | 12/1998 | Lupien et al. |
| 5,920,848 A | 7/1999 | Schutzer et al. |
| 6,240,399 B1 | 5/2001 | Frank et al. |

(Continued)

FOREIGN PATENT DOCUMENTS

| EP | 2422276 | 2/2012 |
| EP | 2422278 | 2/2012 |

(Continued)

OTHER PUBLICATIONS

Lehman, Joel, and Kenneth O. Stanley. "Exploiting open-endedness to solve problems through the search for novelty." ALIFE. 2008. (Year: 2008).*

(Continued)

*Primary Examiner* — Eric Nilsson
(74) *Attorney, Agent, or Firm* — Bey & Cotropia PLLC; Dawn-Marie Bey

(57) ABSTRACT

Roughly described, an evolutionary data mining system includes at least two processing units, each having a pool of candidate individuals in which each candidate individual has a fitness estimate and experience level. A first processing unit tests candidate individuals against training data, updates an individual's experience level, and assigns each candidate to one of multiple layers of the candidate pool based on the individual's experience level. Individuals within the same layer of the same pool compete with each other to remain candidates. The first processing unit selects a set of candidates to retain based on the relative novelty of their responses to the training data. The first processing unit reports successful individuals to the second processing unit, and receives individuals for further testing from the second processing unit. The second processing unit selects individuals to retain based on their fitness estimate.

14 Claims, 13 Drawing Sheets

(56) References Cited

U.S. PATENT DOCUMENTS

| | | | |
|---|---|---|---|
| 6,249,783 B1 | 6/2001 | Crone et al. | |
| 6,941,287 B1 | 9/2005 | Vaidyanathan | |
| 7,013,344 B2 | 3/2006 | Megiddo | |
| 7,370,013 B1 | 5/2008 | Aziz et al. | |
| 7,444,309 B2 | 10/2008 | Branke et al. | |
| 8,527,433 B2 | 9/2013 | Hodjat et al. | |
| 8,909,570 B1 | 12/2014 | Hodjat et al. | |
| 8,918,349 B2* | 12/2014 | Hodjat | G06Q 30/02 705/1.1 |
| 8,977,581 B1 | 3/2015 | Hodjat et al. | |
| 9,002,759 B2 | 4/2015 | Hodjat et al. | |
| 9,466,023 B1 | 10/2016 | Shahrzad et al. | |
| 2001/0019844 A1 | 9/2001 | Kishkovich et al. | |
| 2002/0019844 A1 | 2/2002 | Kurowski | |
| 2002/0080169 A1 | 6/2002 | Diederiks | |
| 2004/0210545 A1 | 10/2004 | Branke et al. | |
| 2004/0254901 A1 | 12/2004 | Bonabeau et al. | |
| 2005/0033672 A1 | 2/2005 | Lasry et al. | |
| 2005/0187848 A1 | 8/2005 | Bonissone et al. | |
| 2005/0198103 A1 | 9/2005 | Ching | |
| 2007/0143198 A1 | 6/2007 | Brandes et al. | |
| 2007/0143759 A1 | 6/2007 | Ozgur et al. | |
| 2007/0185990 A1 | 8/2007 | Ono et al. | |
| 2008/0071588 A1 | 3/2008 | Eder | |
| 2008/0228644 A1 | 9/2008 | Birkestrand et al. | |
| 2009/0125370 A1 | 5/2009 | Blondeau et al. | |
| 2009/0307638 A1 | 12/2009 | McConaghy | |
| 2010/0030720 A1 | 2/2010 | Stephens | |
| 2010/0182935 A1 | 7/2010 | David | |
| 2010/0274736 A1 | 10/2010 | Hodjat et al. | |
| 2010/0274742 A1 | 10/2010 | Hodjat et al. | |
| 2010/0293119 A1 | 11/2010 | Ferringer et al. | |
| 2011/0161264 A1 | 6/2011 | Cantin | |
| 2011/0246834 A1 | 10/2011 | Rajashekara et al. | |
| 2012/0016804 A1 | 1/2012 | Lin | |
| 2012/0095611 A1 | 4/2012 | Yi-Kuei | |
| 2012/0239517 A1 | 9/2012 | Blondeau et al. | |
| 2013/0124440 A1 | 5/2013 | Hodjat et al. | |
| 2013/0254142 A1 | 9/2013 | Hodjat et al. | |
| 2014/0006316 A1 | 1/2014 | Hodjat et al. | |
| 2014/0258279 A1 | 9/2014 | Hayashi | |
| 2016/0283563 A1 | 9/2016 | Hodjat et al. | |
| 2017/0060963 A1 | 3/2017 | Whittaker et al. | |
| 2017/0323219 A1 | 11/2017 | Shahrzad et al. | |

FOREIGN PATENT DOCUMENTS

| | | |
|---|---|---|
| JP | H08-11 0804 | 4/1996 |
| JP | 2001325041 | 11/2001 |
| JP | 2003044665 | 2/2003 |
| JP | 2004240671 | 8/2004 |
| JP | 2004302741 | 10/2004 |
| JP | 2007207173 | 8/2007 |
| JP | 2007522547 | 8/2007 |
| WO | WO 2005/073854 | 8/2005 |
| WO | WO 2010/127039 | 11/2010 |
| WO | WO 2010/127042 | 11/2010 |

OTHER PUBLICATIONS

Hornby, "ALPS: The Age-Layered Population Structure for Reducing the Problem of Premature Convergence," GECCO '06, Seattle, WA, Jul. 2006, 8 pp.

Hornby, G.S., "A Steady-State Version of the Age-Layered Population Structure EA," Chapter I of Genetic Programming Theory and Practice VII, Riolo et al., editors, Springer 2009, 16 pp.

Hornby, G.S., "Steady-State ALPS for Real-Valued Problems," GECCO '09, Montreal, Jul. 2009, Assoc. for Computing Machinery, 8 pp.

Idesign lab, "ALPS—the Age-Layered Population Structure," UC Santa Cruz web article printed Mar. 17, 2011, 3 pp. (http://idesign.ucsc.edu/projects/alps.html).

U.S. Appl. No. 13/184,307, filed Jul. 15, 2011 entitled "Data Mining Technique with Experience-Layered Gene Pool," 47 pages.

Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.

Kosorukoff, "Using incremental evaluation and adaptive choice of operators in a genetic algorithm," Proc. Genetic and Evolutionary Computation Conference, GECCO—Sep. 2002, 7 pp.

Nelson, "Fitness functions in evolutionary robotics: A survey and analysis," Robotics and Autonomous Systems 57 (Apr. 30, 2009) 345-370.

Bongard, J.C. et al., "Guarding Against Premature Convergence while Accelerating Evolutionary Search", GECCO '10: Proceedings of the 12th annual conference on Genetic and Evolutionary Computation, 8 pages (2010).

Wu et al., "An incremental fitness function for partitioning parallel tasks," Proc. Genetic and Evolutionary Computation Conf. (Aug. 2001) 8 pp.

Whitehead, "Genetic Evolution of Radial Basis Function Coverage Using Orthogonal Niches," IEEE Transactions on Neural Networks, 7:6, (Nov. 1996) 1525-28.

Castillo Tapia M.G. et al., "Applications of multi-objective evolutionary algorithms in economics and finance: A survey," Proc. IEEE Congress on Evolutionary Computation, Sep. 2007, pp. 532-539.

Ducheyne, E. et al., "Is Fitness Inheritance Useful for Real-World Applications?" Evolutionary Multi-Criterion Optimization, ser. LNCS 2631, Spring 2003, pp. 31-42.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.

Juille, H. "Evolution of Non-Deterministic Incremental Algorithms as a New Approach for Search in State Spaces," Proc. 6th Int'l Conf. on Genetic Algorithms, 1995, 8 pp.

International Search Report dated Jul. 2, 2010 in PCT/US10/32847.

International Search Report dated Jun. 29, 2010 in PCT/US10/32841.

Sacks, J. et al. "Design and Analysis of Computer Experiments," Statistical Science 4:4, 1989, 409-435.

Torresen, J. "A Dynamic Fitness Function Applied to Improve the Generalisation when Evolving a Signal Processing Hardware Architecture," Proc. EvoWorkshops 2002, 267-299 (12 pp).

Bartlett II, J.E. et al., "Organizational Research: Determining Appropriate Sample Size in Survey Research," IT, Learning, and Performance Journal 19(1) Spring 2001, 8 pp.

Fitzpatrick, J.M. et al., "Genetic Algorithms in Noisy Environments," Machine Learning 3: 101-120, May 1988.

JP 2010-533295, Office Action dated Apr. 16, 2013, English language translation, 3 pages.

Koza, J.R., "Genetic Programming: On the Programming of Computers by Means of Natural Selection", Dec. 1992, MIT Press, pp. 1-609.

Leon C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.

Lopez Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.

Davarynejad et al., "A Novel General Framework for Evolutionary Optimization: Adaptive Fuzzv Fitness Granulation," CEC Sep. 2007, 6 pp.

Davarynejad, M. "Fuzzy Fitness Granulation in Evolutionary Algorithms for complex optimization," Master of Science Thesis, Ferdowsi Univ. of Mashhad, Jun. 2007, 30 pp.

Salami, M. et al., "A fast evaluation strategy for evolutionary algorithms," Applied Soft Computing 2/3F (Jan. 2003) 156-173.

(56) References Cited

OTHER PUBLICATIONS

Poli R et al., "Genetic Programming: An introductory Tutorial and a Survey of Techniques and Applications," Technical Report No. CES-475, ISSN: 1744-8050, Oct. 2007, 112 pp.

Georgilakis, P.S. "Genetic Algorithm Model for Profit Maximization of Generating Companies in Deregulated Electricity Markets," Applied Artificial Intelligence, Jul. 2009, 23:6,538-552.

Refaeilzadeh, P. et al., "Cross Validation" entry, Encyclopedia of Database Systems, eds. Ozsu and Liu, Springer, 2009, 6 pp.

Remde, S. et al. "Evolution of Fitness Functions to Improve Heuristic Performance," LION Dec. 8-10, 2007 II, LNCS 5313 pp. 206-219.

Sakauchi et al., "UNIFINE: A Next Generation Financial Solution System ofNihon Unisys Ltd.," Technology Review 'UNISYS,' Japan, Nihon Unisys Ltd., Feb. 28, 2006, vol. 25, No. 4, pp. 14-15.

Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.

Streichert, "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL:http://www.ra.cs.uni-tuebingen.de/mita rb/streiche/publications/Introduction to Evolutionary Algorithms.pd±).

Tanev I et al., "Scalable architecture for parallel distributed implementation of genetic programming on network of workstations," J. Systems Architecture, vol. 47, Jul. 2001, pp. 557-572.

U.S. Appl. No. 13/184,307—Office Action dated Oct. 21, 2013, 16 pages.

Hornby, Gregory S.,"The Age-Layered Population Structure (ALPS) Evolutionary Algorithm," ACM; GECCO '09, Jul. 8-12, 2009; 7 pages.

U.S. Appl. No. 13/358,381—Office Action dated Jul. 8, 2014, 30 pages.

Freitas, A., "A review of evolutionary algorithms for data mining," Soft Computing for Knowledge Discovery and Data Mining, Springer US, 2008, pp. 79-111.

U.S. Appl. No. 13/540,507—Office Action dated Sep. 9, 2014, 25 pages.

U.S. Appl. No. 13/184,307—Notice of Allowance dated Aug. 4, 2014, 9 pages.

U.S. Appl. No. 13/184,307—Office Action dated Mar. 21, 2014, 36 pages.

Laumanns et al., "A Unified Model for Multi-Objective Evolutionary Algorithms with Elitism"; 2000; IEEE; pp. 46-53.

U.S. Appl. No. 13/540,507—Notice of Allowance, dated Oct. 31, 2014, 9 pages.

U.S. Appl. No. 13/358,381—Notice of Allowance, dated Nov. 19, 2014, 5 pages.

Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.

U.S. Appl. No. 14/595,991—Office Action dated May 10, 2017, 32 pages.

Ahn et al., "Elitism-Based Compact Genetic Algorithms"; 2003; IEEE; Transactions on Evolutionary Computation, vol. 7, No. 4; pp. 367-385.

Akbarzadeh et al., "Friendship Modeling for Cooperative Co-Evolutionary Fuzzy Systems: A Hybrid GA-GP Algorithm," Proc. 22nd Int'l Conf. ofN. American FIPS, Jul. 2003, pp. 61-66.

Bui, L.T. et al., "Local models: An approach to distributed multi-objective optimization," Computational Optimization and Applications, vol. 42, No. I, Jan. 2009, pp. 105-139.

Hodjat et. al., "nPool: Massively Distributed Simultaneous Evolution and Cross-Validation in EC-Star," Sentient Technologies, May 2015, pp. 1-12.

Myers, Raymond H. and Montgomery, Douglas C., Response Surface Methodology: Process and Product Optimization Using Designed Experiments, John Wiley and Sons, Inc., New York, 1995, 12 pages.

Al-Haj Baddar, "Finding Better Sorting Networks," Dissertation to Kent State University for PhD, May 2009, 86 pages.

Cuccu, G., et al., "When Novelty is Not Enough," vol. 6624 in Lecture Notes in Computer Science, published in Applications of Evolutionary Computation, Springer-Verlag Berlin Heidelberg, Copyright 2011, pp. 234-243.

Gomes et al., "Devising Effective Novelty Search Algorithms: A Comprehensive Empirical Study," GECCO '15, Madrid, Spain, Jul. 11-15, 2015, ACM (Copyright 2015), 8 pages.

Gomes et al., "Evolution of Swarm Robotics Systems with Novelty Search," published in Swarm Intelligence, vol. 7, Issue 2, ANTS Special Issue, 2013, pp. 115-144.

Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.

Gupta et al., "An Overview of methods maintaining Diversity in Generic Algorithms," International Journal of Emerging Technology and Advanced Engineering, vol. 2, Issue 5, May 2012, pp. 56-60.

Hodjat et al, "Maintenance of a Long Running Distributed Genetic Programming System for Solving Problems Requiring Big Data," Genetic Finance Chap 1, published in Genetic Programming Theory and Practice XI as Chapter 4, 2014, 20 pages.

Kipfer et al., "UberFlow: A GPU-Based Particle Engine," Computer Graphics and Visualization, The Eurographics Association, Copyright 2004, 9 pages.

Krcah et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.

Lehman et al., "Abandoning Objectives: Evolution through the Search for Novelty Alone," Evolutionary Computation journal, (19):2, MIT Press, Copyright 2011, pp. 189-223.

Lehman et al., "Efficiently Evolving Programs through the Search for Novelty," Proceedings of the Genetic and Evolutionary Computation Conference, ACM, New York NY, Copyright 2010, 8 pages.

Lehman et al., "Evolving a Diversity of Creatures through Novelty Search and Local Competition," Proceedings of the Genetic and Evolutionary Computation Conference, ACM, New York, NY, 2011, 8 pages.

Lehman et al., "Extinction Events Can Accelerate Evolution," PLOS One, journal.pone.0132886, Aug. 12, 2015, 16 pages.

Lehman et al., "Overcoming Deception in Evolution of Cognitive Behaviors," University of Texas at Austin, ACM, Jul. 12-16, 2014, 8 pages.

Lehman et al., "Revising the Evolutionary Computation Abstraction: Minimal Criteria Novelty Search," Proceedings of the Genetic and Evolutionary Computation Conference, GECCO 2010, ACM, 2010, 8 pages.

Mouret et al., "Encouraging Behavioral Diversity in Evolutionary Robotics: An Empirical Study," Massachusetts Institute of Technology, Copyright 2012, Evolutionary Computation 20(1), Spring, 2012, pp. 91-133.

Oreilly, U., et al., "EC-Star: A Massive-Scale, HUB and Spoke, Distributed Genetic Programming System," Evolutionary Design and Optimization Group, published in Genetic Programming Theory and Practice X as Chapter 6, published in V as Chap 1, Springer New York, Copyright 2013, 13 pages.

Salge, C., et al., "Empowerment—An Introduction," published in Guided Self-Organization: Inception, Chap 4, University of Hertfordshire, Copyright 2013, pp. 67-114.

Secretan, J., et al., "Picbreeder: A Case Study in Collaborative Evolutionary Exploration of Design Space," Evolutionary Computation journal, MIT Press, Copyright 2011, 30 pages.

Shahrzad, H., et al., "Tackling the Boolean Multiplexer Function Using a Highly Distributed Genetic Programming System," pub-

(56) References Cited

OTHER PUBLICATIONS lished in Genetic Programming Theory and Practice XII, Springer International Publishing, Copyright 2015, pp. 167-179.

Valsalam, V.K., et al., "Using Symmetry and Evolutionary Search to Minimize Sorting Networks," Journal of Machine Learning Research 14, The University of Texas at Austin, Department of Computer Science, 2013, pp. 303-331.

Wissner-Gross, et al., "Causal Entropic Forces," Physical Review Letters, PRL 110, 168702, American Physical Society, Apr. 19, 2013, 5 pages.

International Search Report and Written Opinion for PCT Application No. PCT/US18/66610, dated Apr. 15, 2019, 8 pp.

Lehman, Joel, et al., "Exploiting open-endedness to solve problems through the search for novelty," ALIFE, 2008.

U.S. Appl. No. 14/595,991—Response to Office Action dated May 10, 2017, filed Nov. 10, 2017, 29 pages.

U.S. Appl. No. 14/595,991—Final Office Action dated Feb. 27, 2018, 25 pages.

U.S. Appl. No. 14/595,991—Response to Final Office Action dated Feb. 27, 2018, filed Jul. 27, 2018, 41 pages.

U.S. Appl. No. 14/595,991—Response to Final Office Action dated Feb. 27, 2018, filed May 22, 2018, 32 pages.

Stanley et al., Why greatness cannot be planned: the myth of the objective, Genet. Program Evolvable Mach.,m 16:559-561, 2015.

U.S. Appl. No. 13/540,507—Response filed Oct. 15, 2014, 20 pages.

U.S. Appl. No. 13/358,381—Response dated Oct. 3, 2014, 21 pages.

U.S. Appl. No. 13/184,307—Response dated Jun. 23, 2014, 32 pages.

U.S. Appl. No. 13/184,307—Response dated Jan. 22, 2014, 19 pages.

U.S. Appl. No. 13/945,630—Office Action dated Mar. 12, 2015, 18 pages.

Deb, et al., "A Fast and Elitist Multiobjective Genetic Algorithm: NSGA II," IEEE Transactions on Evolutionary Computation, vol. 6, No. 2 pp. 182-197, Apr. 2002.

Stanley, et al., "Why Greatness Cannot Be Planned: The Myth of the Objective," New York, NY, Springer (2015).

* cited by examiner

INDIVIDUAL

|  | INDIVIDUAL ID | EXPERIENCE | FITNESS | | |
|---|---|---|---|---|---|
| RULE 1 | P/V 1.1 | P/V 1.2 | ... | P/V 1.M | OUTPUT 1 |
| RULE 2 | P/V 2.1 | P/V 2.2 | ... | P/V 2.M | OUTPUT 2 |
| RULE 3 | P/V 3.1 | P/V 3.2 | ... | P/V 3.M | OUTPUT 3 |
| RULE 4 | P/V 4.1 | P/V 4.2 | ... | P/V 4.M | OUTPUT 4 |
| RULE 5 | P/V 5.1 | P/V 5.2 | ... | P/V 5.M | OUTPUT 5 |

FIG. 3

TRAINING DATA

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

FIG. 4

DATA MINING TECHNIQUE WITH DISTRIBUTED NOVELTY SEARCH

CROSS-REFERENCE TO OTHER APPLICATION

This application is a continuation of application Ser. No. 15/146,846, entitled "DATA MINING TECHNIQUE WITH DISTRIBUTED NOVELTY SEARCH," filed in the U.S. Patent and Trademark Office on May 4, 2016, the entire disclosure of which is hereby incorporated by reference. U.S. Pat. No. 8,909,570, entitled "Data Mining Technique with Experience-Layered Gene Pool," issued on Dec. 9, 2014 is incorporated by reference herein.

BACKGROUND

The invention relates generally to improved genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining Many techniques have been applied to the problem, but the present discussion concerns a class of techniques known as genetic algorithms Genetic algorithms have been applied to all of the above-mentioned environments. With respect to stock categorization, for example, according to one theory, at any given time, 5% of stocks follow a trend. Genetic algorithms are thus sometimes used, with some success, to categorize a stock as following or not following a trend.

Evolutionary algorithms, which are supersets of Genetic Algorithms, are classifiers which are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment.

A fitness function may be defined by the degree to which an evolving rule set is successfully negotiating the environment. A fitness function is thus used for evaluating the fitness of each individual in the environment.

A procreation function generates new individuals by mixing rules of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, a set of individuals within the environment are selected to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation. A homogeneous population can cause a genetic algorithm to converge prematurely to local optima. Once such convergence occurs, the search typically terminates without having found optima which may be more global. Aspects of the present invention address this problem.

SUMMARY

U.S. patent application Ser. No. 14/011,062, incorporated by reference herein, describes client/server arrangements for implementing an evolutionary data mining system. In some such arrangements, the pool of candidate individuals is distributed over a multitude of clients for evaluation. Each client continues to evaluate its own client-centric candidate pool using portions of data from a training database or data feed, which it may receive in bulk or recurrently. Individuals that satisfy one or more predefined conditions on a client computer are transmitted to the server to form part of a server candidate pool.

In the above-incorporated application, the functions of the server may be federated. Roughly described, this is achieved by providing "mid-chain" evolutionary coordinators, and placing them between the main server (which in this arrangement can be called a "top-chain" evolutionary coordinator, or a "master" evolutionary coordinator) and the clients (which in this arrangement can be called "evolutionary engines"). Multiple levels of mid-chain evolutionary coordinators can be used in a hierarchy, and the various branches of the hierarchy need not have equal length. Each evolutionary coordinator (other than the top-chain evolutionary coordinator) appears to its up-chain neighbor as if it were an evolutionary engine, though it does not actually perform any evolution itself Similarly, each evolutionary coordinator (including the top-chain evolutionary coordinator) also appears to its down-chain neighbors as a top-chain evolutionary coordinator. Each mid-chain evolutionary coordinator maintains its own local candidate pool, reducing the load on the top-chain evolutionary coordinator pool, as well as reducing bandwidth requirements. As used herein, the term "evolutionary unit" includes both "evolutionary coordinators" and "evolutionary engines".

To achieve a diverse population, individuals may be selected for procreation based on the diversity of their output with respect to a common set of test data. A novelty function may evaluate the difference in behavior between a pair of individuals, allowing selection of a set of individuals that demonstrate the most diverse behavior for a common set of inputs. For example, individuals producing outputs that are most different from each other are considered herein to be most novel with respect to one another. On the other hand, individuals which produce outputs that are most similar to one another are considered herein to be least novel with respect to one another, even if their internal rules are markedly different from each other.

Many application domains are best served by producing a diversity of solutions, covering the search space as broadly as possible. Novelty Search, by its very nature, promotes phenotypical diversity. In embodiments herein, Evolutionary Engines (EEs) can be configured to use Novelty Search for their parent selection, while the Evolutionary Coordinators (ECs) make use of a fitness estimate to decide which individuals to allow into the server pool. Evolutionary Engines receive individuals from Evolutionary Coordinators for gaining additional experience, and these individuals are added to the elitistpool.

The above summary is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 3 is a symbolic drawing of an individual in either the candidate pool or the production population of individuals in FIG. 1.

FIG. 4 is a symbolic drawing indicating how training data is organized in the training database in FIG. 1.

DETAILED DESCRIPTION

Figure 1:
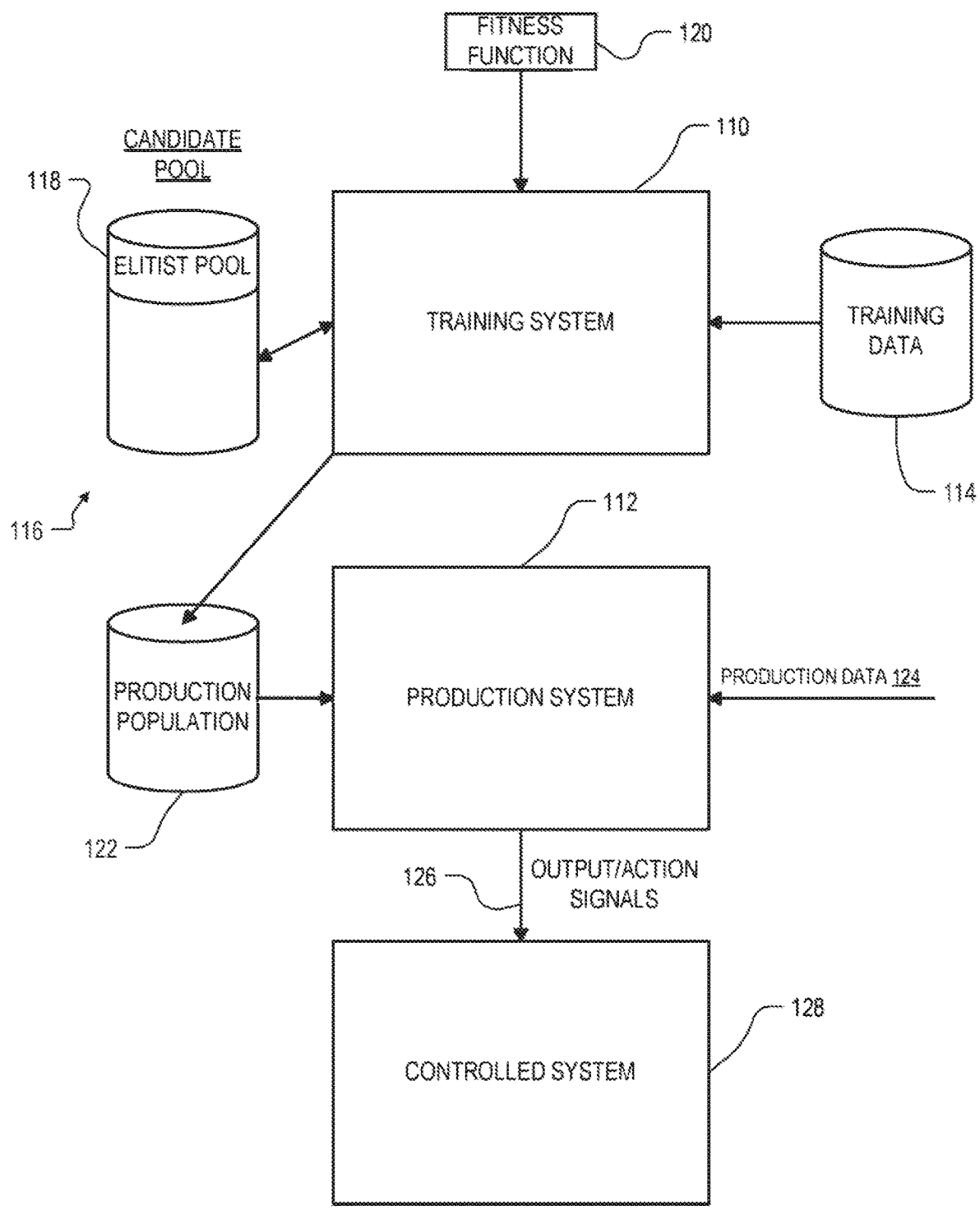
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The action signals from an individual can be transmitted to the appropriate controlled system for execution.

One difference between the data mining environments of the embodiments described herein, and many other environments in which evolutionary algorithms can be applied, is that the fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. This means that if an individual is "lucky" early on, in the sense that the first set of samples that it was given for testing happened to have been in some sense "easy", then after only the first set of samples the individual will appear to be fitter than it actually is. If compared to other individuals that have much more experience, lucky individuals could displace individuals whose fitness estimates are lower but more realistic. If care is not taken, therefore, the algorithm will optimize for individuals that are lucky early on, rather than their actual fitness.

A solution to the problem of optimizing for individuals that are lucky early on, rather than their actual fitness, is to consider individuals for the elitist pool only after they have completed testing on a predetermined number of samples, for example 1000 samples. Once an individual has reached that minimum threshold experience level, comparisons with other individuals are considered valid and can compete on the basis of fitness for a place in the elitist pool. The same problem can occur to a lesser degree even to individuals within the elitist pool, and a similar solution can be applied there as well. Thus in general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in [$L_0 \ldots L_{T-1}$] contains only individuals with a respective range of testing experience [ExpMin(Li) . . . ExpMax(Li)], each ExpMin($L_{i+1}$)>ExpMax($L_i$). The minimum experience level of the bottom layer $L_0$ is 0, and the top layer $L_T$ has a minimum experience level ExpMin($L_T$) but no maximum experience level. Preferably, the experience ranges of contiguous layers are themselves contiguous, so that ExpMin($L_{i+1}$)=ExpMax($L_i$)+1, for $0<=i<T$. Note that testing experience level is a significantly different basis on which to stratify individuals in an elitist pool than age in the sense of ALPS. ALPS means Age-Layered Population Structure, in which an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool), rather than a measure of the number of training samples on which an individual has been tested.

In an embodiment, each layer i in the elitist pool (i.e. in layers [$L_1 \ldots L_T$]) is permitted to hold a respective maximum number of individuals, Quota($L_i$). The quota is chosen to be small enough to ensure competition among the individuals within the corresponding range of experience levels, but large enough to ensure sufficient diversity among the fit individuals that graduate to the next higher layer. Preferably the quota of each such layer is fixed, but in another embodiment it could vary. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually graduate to the next higher experience layer. If the next higher experience layer is not yet full, then the individual may be added to that higher layer. If the higher layer is full, then the individual has to compete for its place in that layer. If the graduating individual does not successfully compete in the new layer, then the individual is discarded, and the individuals in the next higher layer will be retained. Otherwise, the graduating individual is accepted into the higher layer and a displaced individual is discarded. The algorithm for performing competition among individuals in the elitist pool may be different in an evolutionary engine than in an evolutionary coordinator. In an embodiment, individuals that have reached the top layer of the EC candidate pool do not undergo further testing.

In the client/server arrangement, each client evaluates its own client-centric candidate pool using portions of data from a training database or data feed, and individuals that satisfy one or more predefined conditions on a client computer are transmitted to the server to form part of a server candidate pool. The operation of an evolutionary engine (client) and evolutionary coordinator (server) have many similarities. Each type of evolutionary unit receives individuals, assigns each incoming individual to a layer in its local candidate pool, discards individuals in layers that exceed a quota for the number of individuals for that layer, and identifies individuals to pass outside of the unit including: the client harvesting the best individuals to send to the server, the server sending individuals back to a client for further testing, or the server passing individuals into production.

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate pool. As used herein, the term "database" does not necessarily imply any unity of structure. For example, two or more separate databases, when considered together, still constitute a "database" as that term is used herein. In particular, though candidate pool 116 may appear in FIG. 1 as a unitary structure, whereas in the federated embodiments described herein it is actually spread over multiple storage engines. The candidate pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In a financial asset trading environment, an individual might provide trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the training data.

The production system 112 operates according to a production population of individuals in another database 122. The production system 112 applies these individuals to production data 124, and produces outputs 126, which may be action signals or recommendations. In the financial asset trading environment, for example, the production data 124 may be a stream of real time stock prices and the outputs 126 of the production system 112 may be the trading signals or instructions that one or more of the individuals in production population 122 outputs in response to the production data 124. In the healthcare domain, the production data 124 may be current patient data, and the outputs 126 of the production system 112 may be a suggested diagnosis or treatment regimen that one or more of the individuals in production population 122 outputs in response to the production data 124. The production population 122 is harvested from the training system 110 once or at intervals, depending on the embodiment. Preferably, only individuals from elitist pool 118 are permitted to be harvested. In some embodiments, only individuals in the top layer of the elitist pool are harvested. In an embodiment, further selection criteria is applied in the harvesting process.

The controlled system 128 is a system that is controlled automatically by the signals 126 from the production system. In the financial asset trading environment, for example, the controlled system may be a fully automated brokerage system which receives the trading signals via a computer network (not shown in FIG. 1) and takes the indicated action. Depending on the application environment, the controlled system 128 may also include mechanical systems such as engines, air-conditioners, refrigerators, electric motors, robots, milling equipment, construction equipment, or a manufacturing plant.

Figure 2:
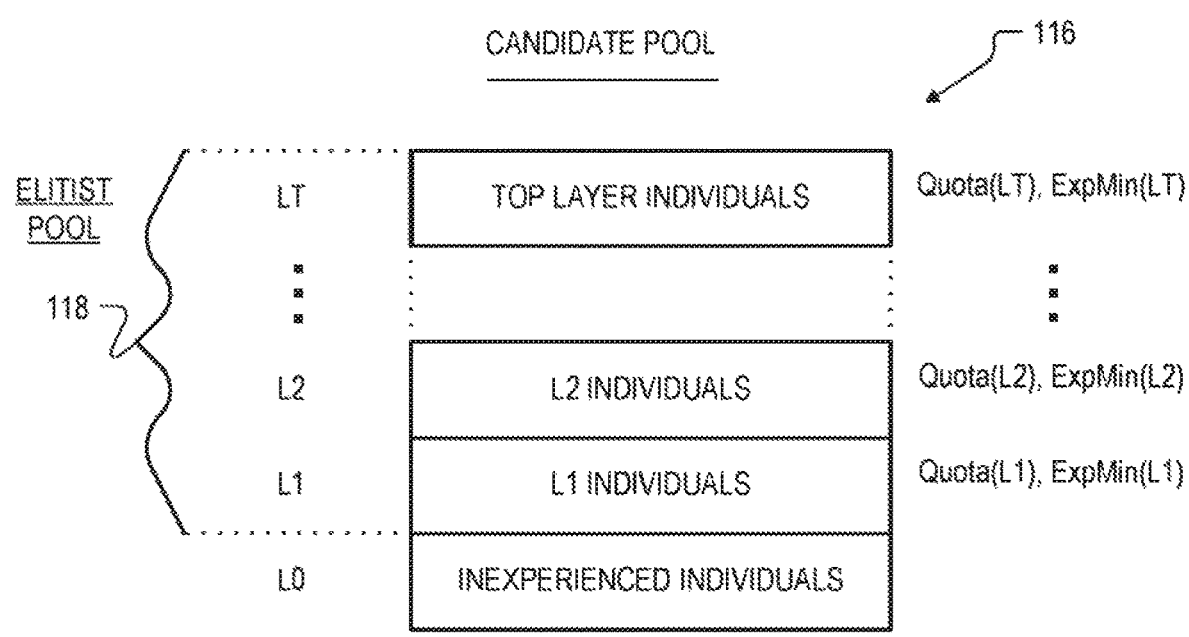
FIG. 2 is a symbolic drawing of the candidate pool in FIG. 1.

FIG. 2 is a symbolic drawing of the candidate pool 116 in FIG. 1. As can be seen, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota Quota($L_i$) for the layer, a range of experience levels [ExpMin($L_i$) . . . ExpMax($L_i$)] for the layer, and in some embodiments the minimum fitness FitMin($L_i$) for the layer. For example, an embodiment in the financial asset trading environment may have on the order of 40 or 50 layers in the elitist pool, each containing individuals with experience levels within a range on the order of 4000-5000 trials. The minimum experience level ExpMin ($L_1$) may be on the order of 8000-10,000 trials, and each layer may have a quota on the order of 100 individuals.

In the embodiment of FIG. 2, the quotas for all the layers in the elitist pool 118 are equal and fixed. In another embodiment, the quotas are not required to be fixed, nor are the quotas required to be the same across layers of the candidate pool. In addition, ExpMin($L_0$)=0 in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

For an embodiment in which each layer is assigned a minimum fitness value, the FitMin( ) values associated with layers of the elitist pool are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layers in candidate pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate pool 116 using the SQL "insert" statement, and individuals being discarded can be deleted using the SQL "delete" statement. In another embodiment, the individuals in candidate pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list. Discarding causes an individual to be removed from competition, but in some embodiments, information about the individual may be recorded or logged for other purposes.

FIG. 3 is a symbolic drawing of an individual 310 in either the candidate pool 116 or the production population 122 of individuals. As used herein, an "individual" is defined by its contents. An individual created by procreation is considered herein to constitute a different individual than its parents, even though it retains some if its parents' genetic material. In this embodiment, the individual identifies an ID 312, its experience level 314, and its current fitness estimate 316. An individual represents a full solution-space in that it contains the "classification rules" 318 needed to classify an item of test data. In this embodiment, each row of the table represents a classification rule. Each rule contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the training data 114 on which it is tested, and its fitness estimate 316 is determined by fitness function 120, averaged (or otherwise combined) over the all the trials.

A rule is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. In the embodiment of FIG. 3, the individual's conditions are all specified as parameter/value ("P/V") pairs, where each P is a parameter, and each V is a value for the parameter. For example, a "parameter" in one of the conditions might be "minimum time of day", and the "value" of the condition might be "3:00 pm". In this case the condition is satisfied for a given sample of data only if the time-of-day stamp on the sample (the indicator) has a value of 3:00 pm or later. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent. In the drawing of FIG. 3, an individual is illustrated as having a rectangular table of rules, a rule being illustrated as a horizontal row of the table. Each condition of the rule is illustrated as a cell in the row. While the drawing shows each of the rules as having the same number M of conditions, this is only a simplification for convenience of description, because they enable the drawing to identify individual conditions in the form "P/V x,y", where x is the rule (row) number and y is the condition (column) number within rule x. In general different rules in an individual can have different numbers of conditions.

In a financial asset trading embodiment, during training, an individual can be thought of as a virtual trader that is given a hypothetical sum of money to trade using historical data. Such trades are performed in accordance with a set of rules that define the individual thereby prompting it to buy, sell, hold its position, or exit its position. The outputs of the rules are trading action signals or instructions, such as buy, sell, exit or hold. Rules may also be designed to contain gain-goal and stop-loss targets, thus rendering the exit action redundant. A hold occurs when no rule in the individual is triggered, therefore, the individual effectively holds its current position. The indicators on which the rules are based can be, for example, a time increment ("tick"), or the closing price for a stock day.

The following code defines an example rule in terms of conditions and indicators, as well as the action asserted by the rule, in accordance with one embodiment of the present invention:

if (PositionProfit>=2% and !(tick=(−54/10000)% prev tick and MACD is negative)
  and !(tick=(−119/10000)% prev tick and Position is long))
  and !(ADX×100<=5052))
then SELL where "and" represents logical "AND" operation, "!" represents logical "NOT" operation, "tick", "MACD" and "ADX" are stock indicators, "SELL" represents action to sell, and "PositionProfit" represents the profit position of the individual.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

ifpulse>=120 and 18<=blood pressure[6]<20 and temp>=104 and surgery duration<22 and clamp on artery and medication=EB45 and last medication>=60 and !white blood cell count [3]<−2.3 and !oxygen level [1]<−1.1-->>>
then thromboembolism @ prob<=0.65

The training data is arranged in the database 114 as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

FIG. 4 is a symbolic drawing indicating how the training data is organized in the database 114. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day. In another embodiment, a sample can contain tick data for a different time interval, which may be shorter or longer than one trading day.

Federated Client/Server Arrangement

An embodiment of the invention will be described in the context of a federated arrangement.

In some environments, the training data used to evaluate an individual's fitness can be voluminous. Therefore, even with modern high processing power and large memory capacity computers, achieving quality results within a reasonable time is often not feasible on a single machine. A large candidate pool also requires a large memory and high processing power. In one embodiment, therefore, a federated client/server model is used to provide scaling in order to achieve high quality evaluation results within a reasonable time period.

Roughly described, the federated arrangement is achieved by providing "mid-chain" evolutionary coordinators, and placing them between the main server (which in this arrangement can be called a "top-chain" evolutionary coordinator, or a "master" evolutionary coordinator) and the clients (which in this arrangement can be called "evolutionary engines"). Multiple levels of mid-chain evolutionary coordinators can be used in a hierarchy, and the various branches of the hierarchy need not have equal length. Each evolutionary coordinator (other than the top-chain evolutionary coordinator) appears to its up-chain neighbor as if it were an evolutionary engine, though it does not actually perform any evolution itself Similarly, each evolutionary coordinator (including the top-chain evolutionary coordinator) also appears to its down-chain neighbors as a top-chain evolutionary coordinator. Each mid-chain evolutionary coordinator maintains its own local candidate pool, reducing the load on the top-chain evolutionary coordinator pool, as well as reducing bandwidth requirements.

In broad overview, all the work in testing of candidate individuals on training data is performed by the evolutionary engines. The EE's also generate their own initial sets of individuals, enforce competition among the individuals in their own respective candidate pools, and evolve their best performing candidates by procreation. The EC's, on the other hand, perform no testing. Instead they merely coordinate the activities of their respective down-chain engines. Each evolutionary engine that has an up-chain neighbor ends its best performing candidates to its up-chain EC, and also receives additional candidates from its up-chain EC for further testing. Each evolutionary coordinator that has a down-chain neighbor (i.e. each EC in FIG. 11) receives individuals from its respective down-chain engines which the down-chain engines had considered top performers, and requires the received individuals to compete for entry into the EC's own local candidate pool 1122. If a received candidate is one which the EC had previously sent down to the down-chain engine for further testing, then the EC first updates its local understanding of the fitness of the individual prior to the competition. Each EC also sends down candidates from its own local pool for further testing as required. At various times, like the EE's, each EC harvests individuals from its own local pool which the EC considers to be its top performers. If the EC is a mid-chain EC 1120, then it sends its harvested individuals to its up-chain EC, which may be the top-chain EC 1110 or another mid-chain EC 1120. If the EC is the top-chain EC, then it sends its harvested individuals for deployment.

In a federated environment, an evolutionary engine need not be aware of whether its immediate coordinator is a top-level coordinator, as in the client/server case described earlier, or whether its immediate coordinator is a mid-chain coordinator. Similarly, the top-level coordinator need not be aware that it directly coordinates mid-chain coordinators rather than coordinating evolutionary engines directly. Thus, a mid-chain coordinator operates as a coordinator as described above with the following exceptions. The individuals harvested from a mid-chain coordinator are not placed directly into production, but rather, are forwarded to a higher level coordinator, such as the top-level coordinator. Also, a mid-chain coordinator may receive individuals from its up-chain coordinator, the individuals requiring further testing. Except for these two exceptions, a mid-chain coordinator behaves as an evolutionary engine.

Figure 11:
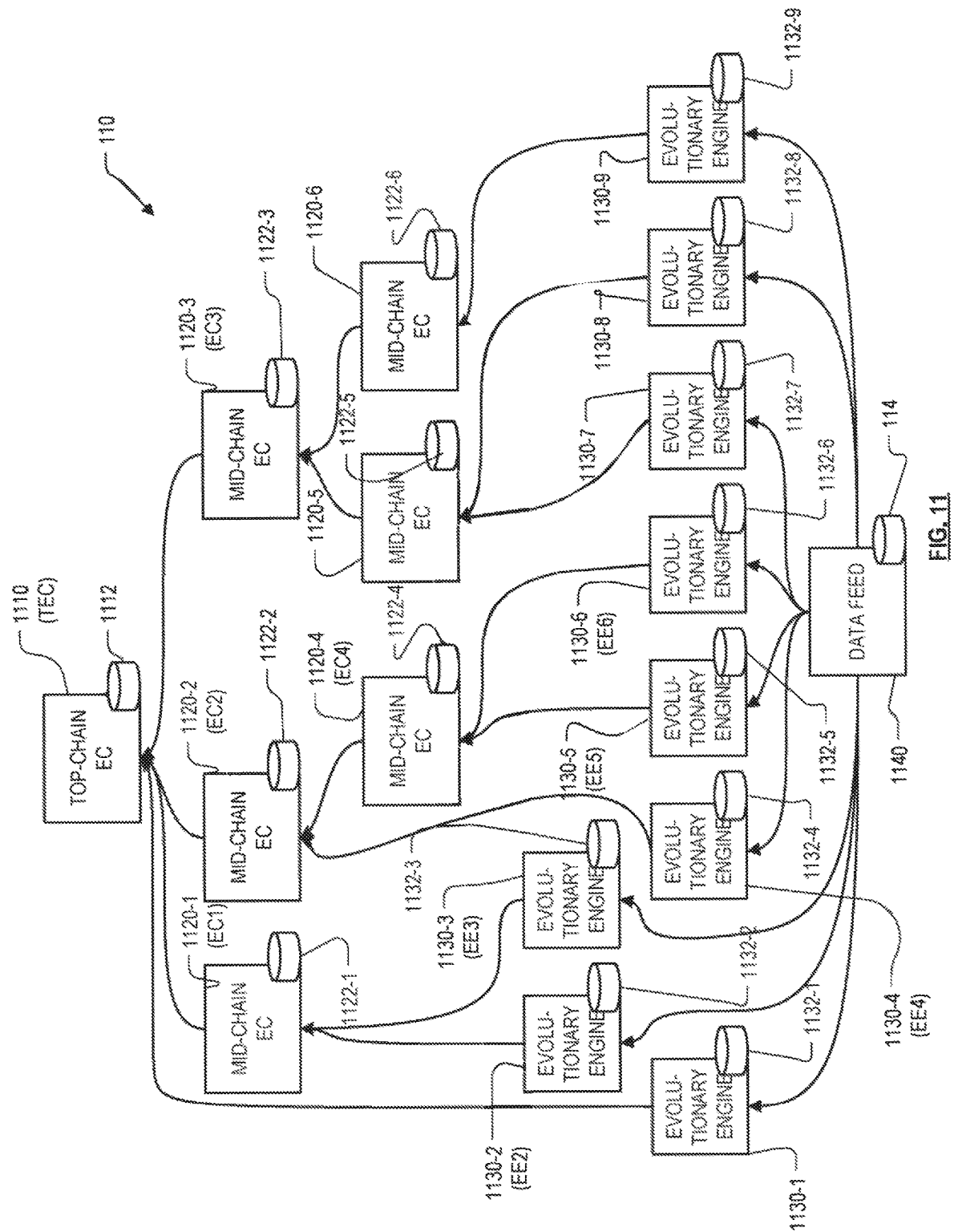
FIG. 11 is a symbolic diagram of a federated training system of FIG. 1, according to an embodiment of the invention.

FIG. 11 is a symbolic diagram of training system 110. It comprises a top-chain evolutionary coordinator (EC) 1110, which is also sometimes referred to herein as the master EC. Top-chain EC 1110 maintains the master candidate pool 1112.

Down-chain from the top-chain EC 1110 is a set of mid-chain EC's 1120-1 through 1120-6 (collectively 1120). Specifically, mid-chain EC's 1120-1 through 1120-3 are immediately down-chain from top-chain EC 1110. Mid-chain EC 1120-4 is immediately down-chain from mid-chain EC 1120-2, and mid-chain EC's 1120-5 and 1120-6 are each immediately down-chain from mid-chain EC 1120-3. Each of the mid-chain EC's 1120 maintains its own local candidate pool 1122-1 through 1122-6, respectively (collectively 1122).

Down-chain from the mid-chain EC's 1120 are a plurality of evolutionary engines (EE's) 1130-1 through 1130-9 (collectively 1130). Specifically, EE 1130-1 is immediately down-chain from top-chain EC 1110, and EE's 1130-2 and 1130-3 are each immediately down-chain from mid-chain EC 1120-1. EE 1130-4 is immediately down-chain from mid-chain EC 1120-2, and EE's 1130-5 and 1130-6 are each immediately down-chain from mid-chain EC 1120-4. EE's 1130-7 and 1130-8 are each immediately down-chain from mid-chain EEC 1120-5, and EE 1130-9 is immediately down-chain from mid-chain EEC 1120-6. Like the EC's 1120, each of the EE's 1130 maintains its own local candidate pool 1132-1 through 1132-6, respectively (collectively 1132).

Each EE 1130 further has a communication port through which it can access one or more data feed servers 1140, which retrieve and forward training samples from the training database 114. Alternatively, although not shown, the training samples may be supplied from data feed server 1140 to the EE's 1130 via one or more of the EC's 1120. The data feed server 1140 can also be thought of as simply a port through which the data arrives or is retrieved. Each of the EC's 1110 and 1120 maintains a local record of the IP address and port number at which each of its immediate down-chain engines receives individuals delegated for evaluation, and delegating an individual to a particular one of the down-chain engines for evaluation involves transmitting the individual (or an identification of the individual) toward the IP address and port number of the particular engine.

The EE's 1130, and in some embodiments one or more of the EC's 1120 as well, are volunteers in the sense that they can come and go without instruction from the up-chain neighboring engines. When an EC 1120 joins the arrangement, it receives the IP address and port number of its immediately up-chain neighbor and the minimum experience level acceptable to the up-chain neighbor for candidates being sent up from the new EC 1120. EE's 1130 joining the arrangement receive that information plus the IP address and port number of data feed server 1140. This information can be sent by any server that manages the hierarchy of evolutionary engines in the system. In one embodiment that can be the top-chain evolutionary coordinator 1110, whereas in another embodiment it can be a separate dedicated management server (not shown).

As used herein, the terms down-chain and up-chain are complimentary: if a second engine is down-chain from a first engine, then the first engine is up-chain from the second engine, and vice-versa. In addition, the terms "immediately" up-chain and "immediately" down-chain preclude an intervening evolutionary engine, whereas the terms up-chain and down-chain themselves do not. Even "immediately", however, does not preclude intervening components that are not evolutionary engines. Also as used herein, the term "evolutionary engine" includes both evolutionary coordinators and evolutionary engines, and the term "evolutionary coordinator" includes both mid-chain evolutionary coordinators and the top-chain evolutionary coordinator.

It can be seen from FIG. 11 that the branches of the hierarchy of EC's can be very non-uniform in length and spread. A given branch can contain as few as zero mid-chain EC's 1120, or as many as ten or more in a given embodiment. A given EC also can support as few as one down-chain engine or as many as ten or more, and some can be EE's 1130 while others are other mid-chain EC's 1120. This flexibility is facilitated by the rule that each evolutionary engine appears to its immediately up-chain neighboring engine, if it has one, as if it were an evolutionary engine; and appears to its immediately down-chain neighboring engines, if it has any, as if it were a top-chain evolutionary coordinator.

Moreover, each of the evolutionary engines in FIG. 11 can itself be a cluster of machines rather than just one. It can also be physical or virtual or, in the case of a cluster, partially physical and partially virtual. As a cluster, an evolutionary engine still appears to its up-chain and down-chain engines as a single evolutionary engine or evolutionary coordinator as desired, so that the up-chain and down-chain engines do not need to know that it is not a simple computer system.

For example, one of the mid-chain coordinators can itself be made up of its own internal hierarchy of a top-chain coordinator and one or more mid-chain coordinators, thereby forming a nested arrangement. Similarly, an evolutionary engine can be made up of its own internal hierarchy of engines, such as an internal top-chain coordinator up-chain of one or more internal evolutionary engines, with or without a level of internal mid-chain coordinators.

Still further, in the embodiment of FIG. 11, each evolutionary engine has only one immediately up-chain engine. This is so that when an engine harvests an individual and forwards it up-chain, it will not improperly return the individual to an up-chain engine different from the one that delegated it. Another embodiment may have no such restriction, allowing a given evolutionary engine to have more than one immediately up-chain engine. For example, this might be accomplished by associating, with each individual delegated to another engine in the hierarchy, an indication of the engine to which it should be returned after testing. For new individuals created by an engine having more than one immediately up-chain engine (or created by an engine down-chain from an engine having more than one immediately up-chain engine), the arrangement can implement some predetermined algorithm (e.g. a single default, round robin, or random) for determining to which up-chain engine the individual should be sent after testing and harvesting. Numerous additional variations will be apparent to the reader.

In the arrangement of FIG. 11, scaling is carried out in two dimensions, namely in pool size as well as in evaluation of the same individual to generate a more diverse candidate pool so as to increase the probability of finding fitter individuals. The candidate pool is distributed over a multitude of EE's 1130 for evaluation. Each EE evaluates its own local candidate pool using data from training database 114, and individuals that satisfy one or more predefined conditions on an EE 1130 are transmitted up-chain to form part of the candidate pool in its up-chain EC.

Distributed processing of individuals also may be used to increase the speed of evaluation of a given individual. To achieve this, individuals that are returned to an EC after some testing, but additional testing is desired, may be sent back (delegated) from the EC to a multitude of down-chain engines for further evaluation. The evaluation result achieved by the down-chain engines (sometimes referred to herein as partial evaluation) for an individual is transferred back to the delegating EC. The EC merges the partial evaluation results of an individual with that individual's fitness estimate at the time it was delegated to arrive at an updated fitness estimate for that individual as regards the EC's local candidate pool. For example, assume that an individual has been tested on 1100 samples and is sent from a particular EC to, for example, two down-chain engines (which may be an EE 1130 or another mid-chain EC 1122, or one of each), each instructed to test the individual on 100 additional samples. Each of the down-chain engines further tests the individual on the additional 100 samples (the mid-chain EC 1120 further delegating that task to its further down-chain engines), and reports its own view of the fitness estimate to the requesting up-chain particular EC. The particular EC, having received back the individual with the requested additional testing experience, combines these two estimates with the individual's fitness estimate at the time it was sent to the two down-chain engines, to calculate an updated fitness estimate for the individual as viewed by the particular EC. The combined results represent the individual's fitness evaluated over 700 days. In other words, the distributed system, in accordance with this example, increases the experience level of an individual from 1100 samples to 700 samples using only 100 different training samples at each evolutionary engine. A distributed system, in accordance with the present invention, is thus highly scalable in evaluating its individuals.

In an embodiment, the top-chain EC 1110 maintains locally the master candidate pool. It is experience layered as in FIG. 2, but it does not maintain any candidate individuals below its layer $L_1$. New individuals are created by evolutionary engines 1130, and they are not reported to the top-chain EC 1110 until they have been tested on sufficient numbers of samples to qualify for the elitist pool 118 of the top-chain EC 1110.

Advantageously, EE's 1130 are enabled to perform individual procreation locally, thereby improving the quality of their individuals. Each EE 1130 is a self-contained evolution device, not only evaluating the individuals in its own pool, but also creating new generations of individuals and moving the evolutionary process forward locally. Thus EE's 1130 maintain their own local candidate pool which need not match each other's or that of any of the ECs. Since the EE's 1130 continue to advance with their own local evolutionary process, their processing power is not wasted even if they are not in constant communication with their up-chain neighbors. Once communication is reestablished with the up-chain neighbors, EE's 1130 can send in their fittest individuals up-chain and receive additional individuals from their up-chain neighbors for further testing.

Evolutionary Engine (EE)

Figure 5:
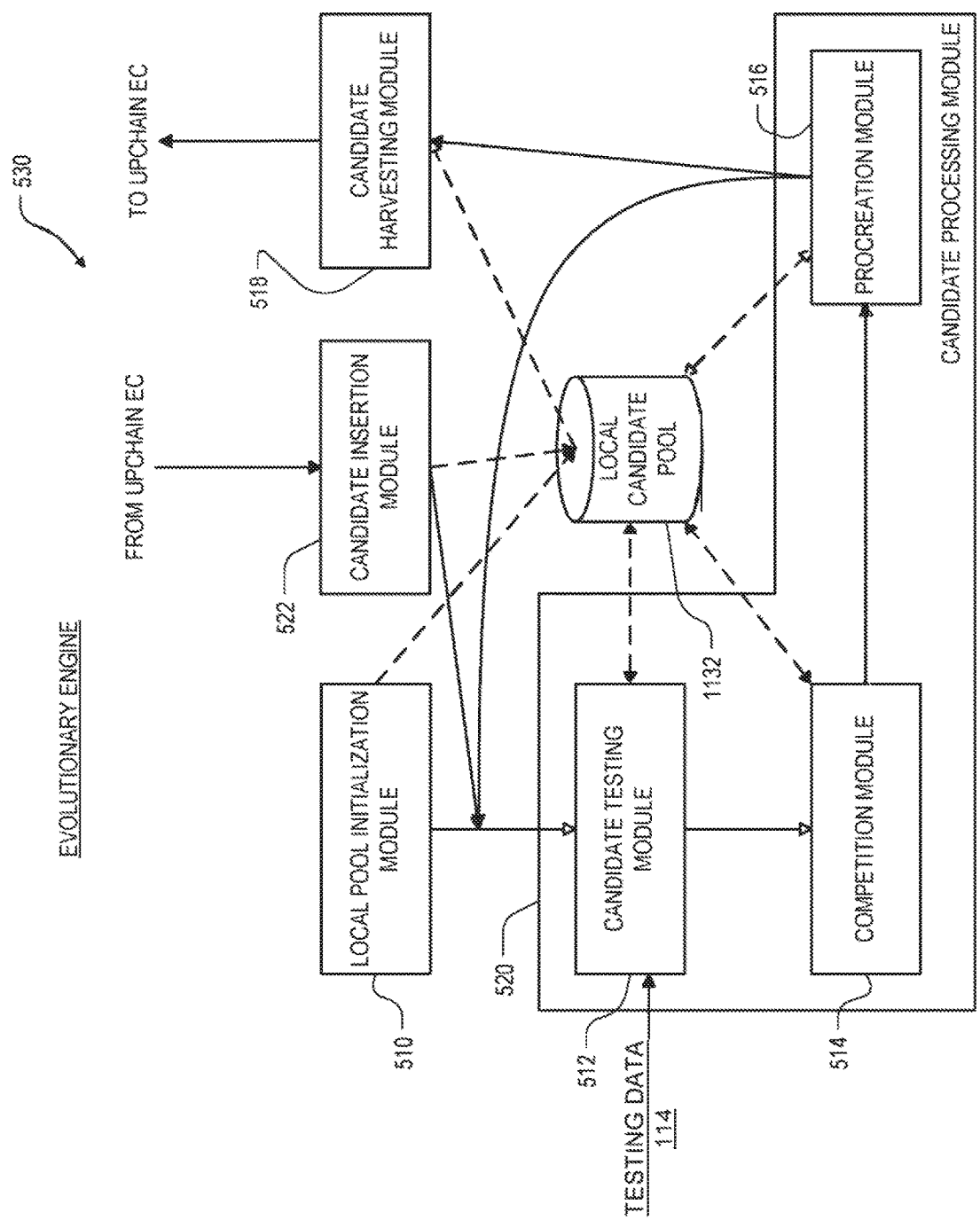
FIG. 5 illustrates various modules that can be used to implement the functionality of an evolutionary engine of FIG. 11.

FIG. 5 illustrates various modules that can be used to implement the functionality of an evolutionary engine 1130. The EE's local candidate pool 1132 is also shown in the drawing. Generally, solid lines indicate process flow, and broken lines indicate data flow. The modules can be implemented in hardware or software, and need not be divided up in precisely the same blocks as shown in FIG. 5. Some can also be implemented on different processor cores or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules", which themselves can be considered herein to constitute modules. In particular, the candidate testing module 512, competition module 514, and procreation module 516 are also considered herein to be sub-modules of a candidate pool processing module 520. The blocks in FIG. 5 designated as modules can also be thought of as flowchart steps in a method. These comments also apply to FIGS. 12 and 13.

A candidate pool 1132 is local to one evolutionary engine and not shared with other evolutionary units. Thus, the same individual may reside in multiple local candidate pools having different state (i.e. the view of an individual may be different across engines).

EE—Receiving Individuals

Figure 6:
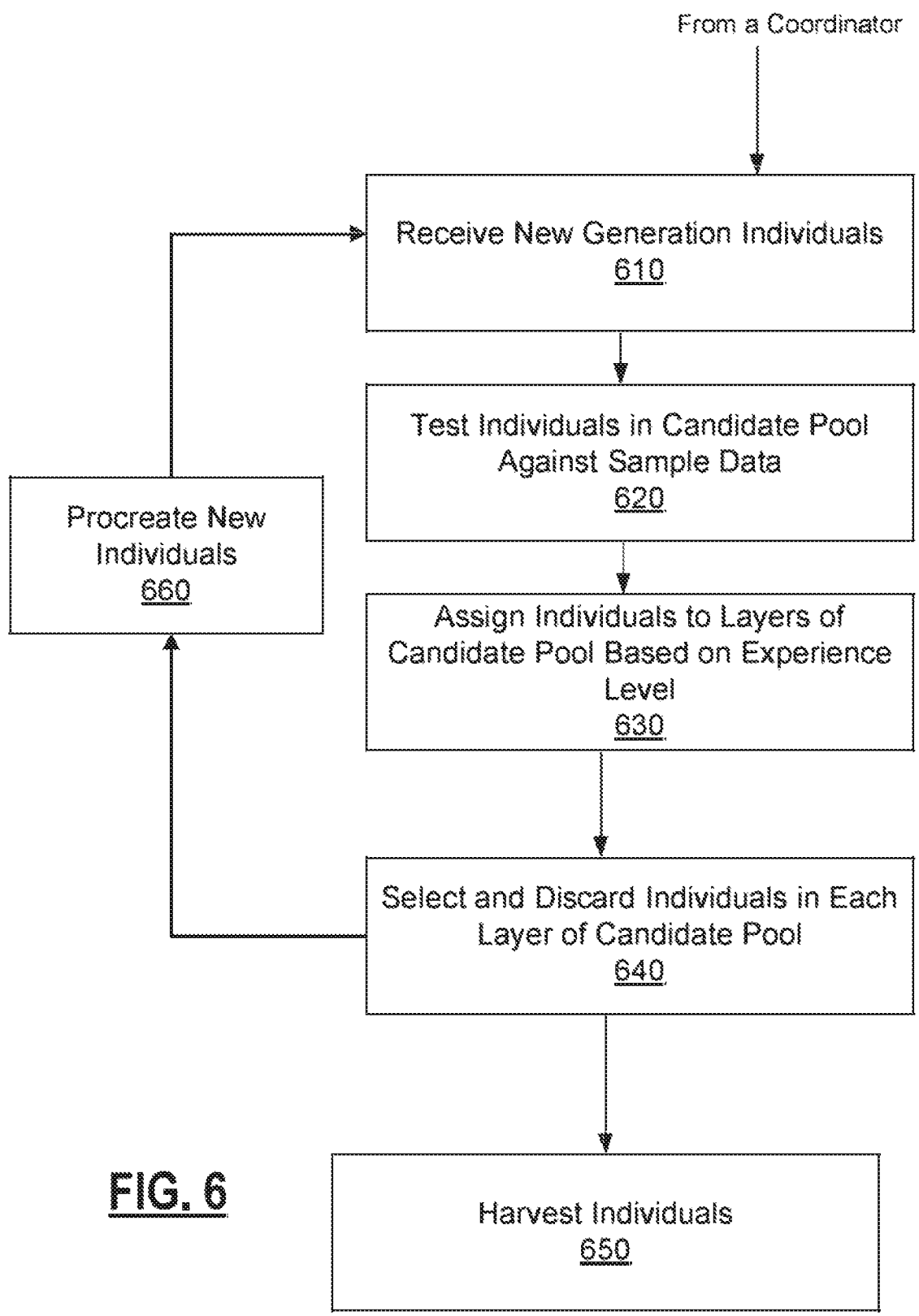
FIG. 6 is a flow diagram showing the basic operation of each evolutionary engine of the evolutionary mining system.

FIG. 6 is a flow diagram showing the basic operation of an evolutionary engine. The basic flow includes in Step 610 receiving new individuals into the engine's candidate pool. Candidates are received into the local candidate pool both by creation locally, and by insertion from an up-chain evolutionary coordinator. Referring to FIG. 5, the local candidate pool 1132 is initialized by pool initialization module 510, which creates an initial set of candidate individuals in Lo of the candidate pool 1132. These individuals can be created randomly, or by some other algorithm, or in some embodiments a priori knowledge is used to seed the first generation. In another embodiment, individuals from prior runs can be borrowed to seed a new run. At the start, all individuals are initialized with an experience level of zero and a fitness estimate that is undefined (not yet estimated).

The number of individuals created by the EE's 1130 may vary depending on the memory size and the CPU processing power of the EE's. An EE 1130 may be implemented on, in addition to the implementation options mentioned above, a laptop computer, a desktop computer, a cellular/VoIP handheld computer or smart phone, a tablet computer, distributed computer, or the like. An example system may have hundreds of thousands of EE's 1130, and an EE 1130 may have on the order of 1000 individuals for evaluation. Each of the evolutionary engines also includes a Candidate Insertion Module 522 by which Individuals may also be received for further testing from an evolutionary coordinator ("coordinator" or "EC").

A newly received incoming individual includes at least an experience level and a fitness estimate, though the fitness estimate may be undefined for newly created individuals. The individuals received from a coordinator for further testing retain their experience level and fitness estimates as received from the coordinator. New individuals do not compete with the other individuals in the local candidate pool 1132 until after a battery of trials (which further refines their fitness estimates and increases their experience levels prior to the competition). New individuals created by procreation within the procreation module 516 may be directly inserted into the local candidate pool 1132 and/or provided to candidate testing module 512.

EE—Testing

In Step 620, individuals in the candidate pool are tested against sample data. Candidate testing module 512 tests all individuals in the local candidate pool. Each individual undergoes a battery of tests or trials on the training data 114, each trial testing the individual on one sample 410 that may represent a plurality of data points in an ordered collection. For example they may represent data collected at multiple time points over the span of some time period such as a single day. The individual's experience level is then increased by the number of data samples in the battery. The final result from testing against a sample (i.e. all data points in the sample) is an indication of the fitness of the individual with respect to that sample.

In an embodiment, the fitness estimate may be an average of the fitness score assigned to each of the results of all trials of the individual. In this case the fitness estimate can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum. It will be appreciated that the fitness estimate maintained in the local candidate pool represents the individual's fitness as viewed by the current evolutionary engine. If the individual had been received from a coordinator for further testing, then the coordinator's view of the individual's fitness may be different from the view of the evolutionary engine. It is for this reason that fitness is sometimes referred to herein as being a fitness version that is "centric" to one evolutionary unit or another (i.e. as viewed by that evolutionary unit).

The final result from testing against a sample is an indication of the fitness of the individuals with respect to that sample, but 'how it reached that output' is the behavior of the individual with respect to that sample. For example, if the data points collected in a sample represent the share price of a particular stock, the individual's behavior in response to each data point of the sample may be to buy, sell, or hold. During this testing phase, each individual may be tested against multiple samples, and the test results of the individual for each sample are recorded. The "behavior" of an individual relative to one sample then is given by its complete history of outputs (buy, sell or hold) for all data points in the sample. And the "behavior" of the individual in a battery of tests is given by the individual's complete history of outputs for all data points in all the samples in the battery.

Because recording the complete behavior of an individual can require a lot of memory, and can involve extensive computations in the competition phase (described elsewhere herein), in an embodiment only a snapshot of the behavior of each individual is recorded. In one embodiment the snapshot aggregates the behavior of the individual over all data points of a sample, so that only one behavioral value is recorded for each full sample on which the individual is tested. This still produces one behavioral value for the individual per sample in the battery of trials. In another embodiment the snapshot also aggregates the behavior of the individual over all samples of a battery of trials, so that only one behavioral value is recorded for the individual for the entire battery of trials. Other kinds of snapshots are also possible in different embodiments, such as aggregation of behavior across some but not all data points in each sample. In an embodiment the behavior (or behavioral snapshot) of an individual for a battery of tests is stored in a vector, with each vector entry storing a snapshot of the behavior of the individual for one particular sample.

Other ways of representing individuals' behavior may be used if there is an associated difference function that takes the representation of behavior for two individuals and returns a distance indicator that can be ranked against other such distance indicators in order to provide a measure of the similarity of behavior of various pairs of individuals.

In some embodiments it may not be revealing to use the state of the individual only at the end of an entire sample, as the aggregated behavioral snapshot for the individual over the entire sample. In such embodiments it may be more revealing to define the aggregated behavioral snapshot for an individual over an entire sample as merely the snapshot at one randomly chosen point within the ordered collection of data points of the sample. In this embodiment the point chosen to represent the behavior of an individual over a particular data sample is the same point for all individuals. In another embodiment, the snapshot may be taken at two points in the ordered collection, or some number k of points less than the total number of points.

EE—Assign Individuals to Layer in the Candidate Pool

Competition module 514 assigns individuals to a layer in the local candidate pool and determines which individuals to discard. In Step 630, individuals are assigned to a layer within the evolutionary engine's candidate pool based on the value of their experience indicator. Higher layers of the candidate pool are reserved for individuals that have been tested the most and survived elimination for each round of testing thus far. Different embodiments use slightly different mechanisms for assigning individuals to layers of the candidate pool for an evolutionary engine. In one embodiment, the process of assigning individuals to candidate pool layers can be thought of as occurring one individual at a time, as follows. First, a loop is begun through all individuals in the local candidate pool whose experience level has changed since the last time the competition module was executed. If the current individual's experience level has not increased sufficiently to qualify it for the next experience layer in the candidate pool, then the individual is ignored and the next one is considered. If the current individual's experience level has increased sufficiently to qualify it for a new experience layer, then the competition module determines whether the target experience layer is already at quota. If not, then the individual is simply moved into that experience level. If the target layer is full, then the competition module determines which individuals within the layer to discard.

The above routine processes individuals sequentially, and different embodiments can implement different sequences for processing the individuals. Note that the processing sequence can affect the results if, for example, an individual in layer Li is being considered for layer $L_{i+1}$ at the same time that an individual in layer $L_{i-1}$ is being considered for layer $L_i$. If the former test occurs first, then a hole will be opened in layer $L_i$ and the individual graduating from layer $L_{i-1}$ will be promoted into layer $L_i$ automatically. If the latter test occurs first, then the individual graduating from layer L will have to compete for its place in layer $L_i$ (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

In another embodiment, all individuals may be grouped by experience level, then in a separate step all layers that are oversubscribed select individuals for discarding so that each layer retains no more than its quota. In this embodiment, the order of assigning individuals to layers does not matter.

EE—Discarding Individuals

Figure 7:
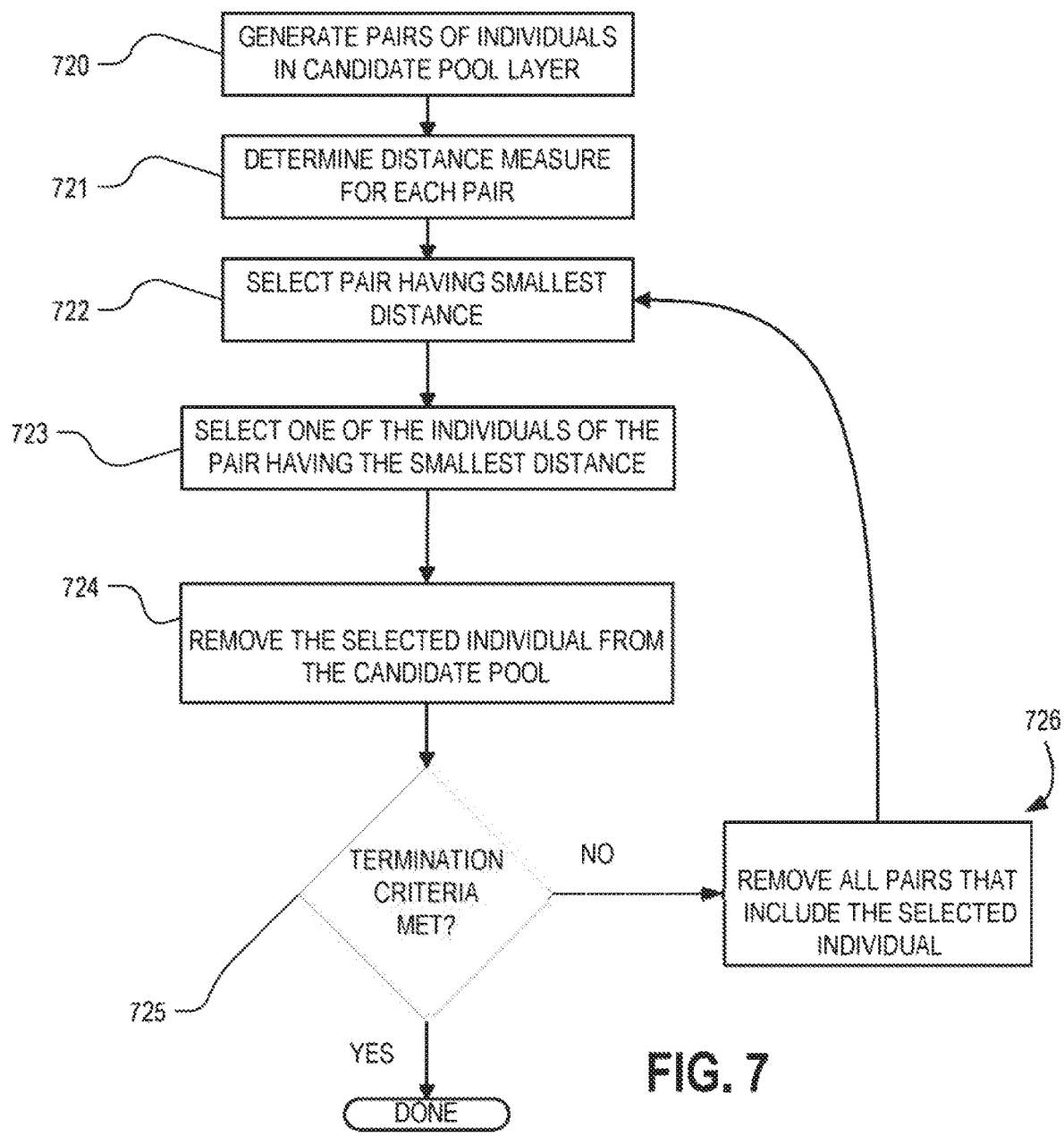
FIG. 7 is a flow diagram showing operations in a competition module of an evolutionary engine, according to an embodiment of the invention.

When the number of individuals assigned to a layer exceeds the quota for that layer, then individuals in the layer need to compete to stay in the candidate pool and avoid being discarded. In Step 640, individuals in each layer of the candidate pool are selected for discarding. Multiple embodiments exist for selecting individuals for discarding, and different evolutionary engines can implement different competition algorithms. FIG. 7 is a flow diagram illustrating a way for selecting individuals to be discarded, according to an embodiment of the invention. In an experience-layered embodiment, the discarding process is performed on each layer of the candidate pool independently of the other layers. Rather than select the fittest individuals, individuals are selected for discarding whose behavior is most similar to another individual in the layer. In other words, a novelty search process is used to retain the individuals having the most diverse behavior, and those individuals with redundant behavior are discarded.

Discarding causes an individual to be removed from competition, but information about the individual may be recorded or logged for other purposes.

EE—Selecting for Novelty

In the embodiment of FIG. 7, attempting to maximize the diversity of individuals within a layer of the candidate pool involves retaining a subset of the layer population, the subset having a number of individuals equal to the quota for the layer, and the individuals having behavior that is most dis-similar from other individuals in the subset. To achieve that, individuals having the most similar behavior are removed from the layer until only the number of individuals equal to the quota are left in the layer. Within a single layer of the candidate pool, in step 720, a list of all pairs of individuals is generated. For each pair of individuals, a distance measure between them is determined. Determining a distance between individuals in each pair at Step 721 involves applying a difference function of the representation of the behavioral snapshot for two individuals. For example, in an embodiment using vectors to store behaviors, each vector may be thought of as representing a point in Euclidean space, and the distance between the points may be determined by the Euclidean distance. However, any distance measure between two vectors can be used.

After associating each pair with the distance between individuals within the pair, in Step 722, the pair having the smallest distance is selected. This pair represents the two individuals having the most similar behavior, and thus keeping both individuals contributes least to diversity of the candidate pool. The pair having the smallest distance can be determined by sorting the pair list by distance. In Step 723 one of the two individuals in the pair having the smallest distance is selected for discarding. There are several ways for determining which of the two individuals of the selected pair is the one to be selected for discarding. In one embodiment, one of the pair is selected at random. In another embodiment, the individual of the pair that has the closest neighbor outside the pair may be selected as the one to discard. In other words, if a pair includes individuals 11 and 12, then a continued search down the sorted list of pairs will find either another pair containing 11 or another pair containing 12, first. Whichever is found first is the individual which is to be selected for discarding.

In another embodiment, the fitness estimates of the individuals in the pair are compared and the individual having the lower fitness estimate is the one to be selected for discarding. However the individual is selected, the selected individual is removed from the candidate pool in Step 724.

In Step 725, the competition module determines whether any more individuals need to be discarded from the current experience layer of the candidate pool. Specifically, the remaining population of the layer is compared against the quota for the layer. If the quota is not exceeded, then no further elimination is required, and the process is done. If the number of individuals in the layer still exceeds the quota for the layer, then in step 726 all pairs that include the discarded individual are removed from the list of pairs, and the process repeats with the remaining pairs at Step 722.

Note that the above novelty competition is performed on all the individuals in a layer of the elitist pool, which is a subset of all the individuals in the overall candidate pool. In general, the novelty competition can be performed among all the individuals in at least a non-null subset of the individuals in the candidate pool. As used herein, the term "subset" includes both proper and improper subsets, as well as the null subset.

It can be seen that in competition module 514 in an evolutionary engine, the main criteria for competition is diversity of the behavior of individuals. Individuals with low fitness estimates often can be chosen over individuals with high fitness estimates, merely because the ones with low fitness estimates are more novel than the ones with high fitness estimates. Fitness is used in the competition only in deciding which of two individuals with very similar behavior is to be selected for discarding—essentially in a tie breaker role. Thus individuals that survive into the top layer in the evolutionary engine are not necessarily the individuals having the greatest fitness estimates; they are individuals having the greatest diversity of behavior.

EE—Harvesting

Returning to FIG. 6, in step 650, sometime after the top layer of the local candidate pool becomes full, the evolutionary engine harvests individuals from its top layer for forwarding to an evolutionary coordinator. Candidate harvesting module 518 retrieves individuals for that purpose. In one embodiment, candidate harvesting module 518 retrieves individuals periodically, whereas in another embodiment it retrieves individuals only in response to user input. Preferably the candidate harvesting module 518 maintains a list of individuals ready for harvesting. It awakens periodically, and forwards all such individuals to the evolutionary coordinator. Preferably, candidate harvesting module 518 selects only from the layer or layers in the local candidate pool 1132 whose minimum experience levels are at least as high as the minimum experience level of the lowest level ($L_1$) maintained by the coordinator. Candidate harvesting module 518 also can apply further selection criteria as well in order to choose desirable individuals. For example, fitness might be used as a criterion at this stage of the process.

EE—Procreation

In Step 660, some individuals from the local candidate pool are used to procreate new individuals. Only individuals in the local elitist pool (i.e. above layer $L_0$) are chosen for procreation. In an embodiment in which the elitist pool is populated based on relative novelty, a subset of individuals selected as parents from that pool will be a diverse set of parents from which to procreate. In an embodiment, Procreation Module 516 then selects the parent individuals randomly from the elitist pool. The parents may be selected from the most experienced layer of the elitist pool. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with an experience level of zero, a fitness estimate that is undefined, and with no behavioral history. These individuals are placed in Lo of the local candidate pool 1132 in Step 610. In an embodiment, Procreation Module 516 adds the new individuals into layer 0 of the candidate pool directly. In another embodiment, Procreation Module 516 provides the new individuals to the Candidate Insertion Module 522.

Preferably, after new individuals are created by combination and/or mutation, the parent individuals are retained. In this case the parent individuals also retain their experience level, their behavioral snapshots, and their fitness estimates, and remain in their then-current local elitist pool layers. In another embodiment, the parent individuals are discarded. After procreation, candidate testing module 512 operates again on the updated candidate pool. The process continues repeatedly.

Evolutionary Coordinators (EC)

Figure 8:
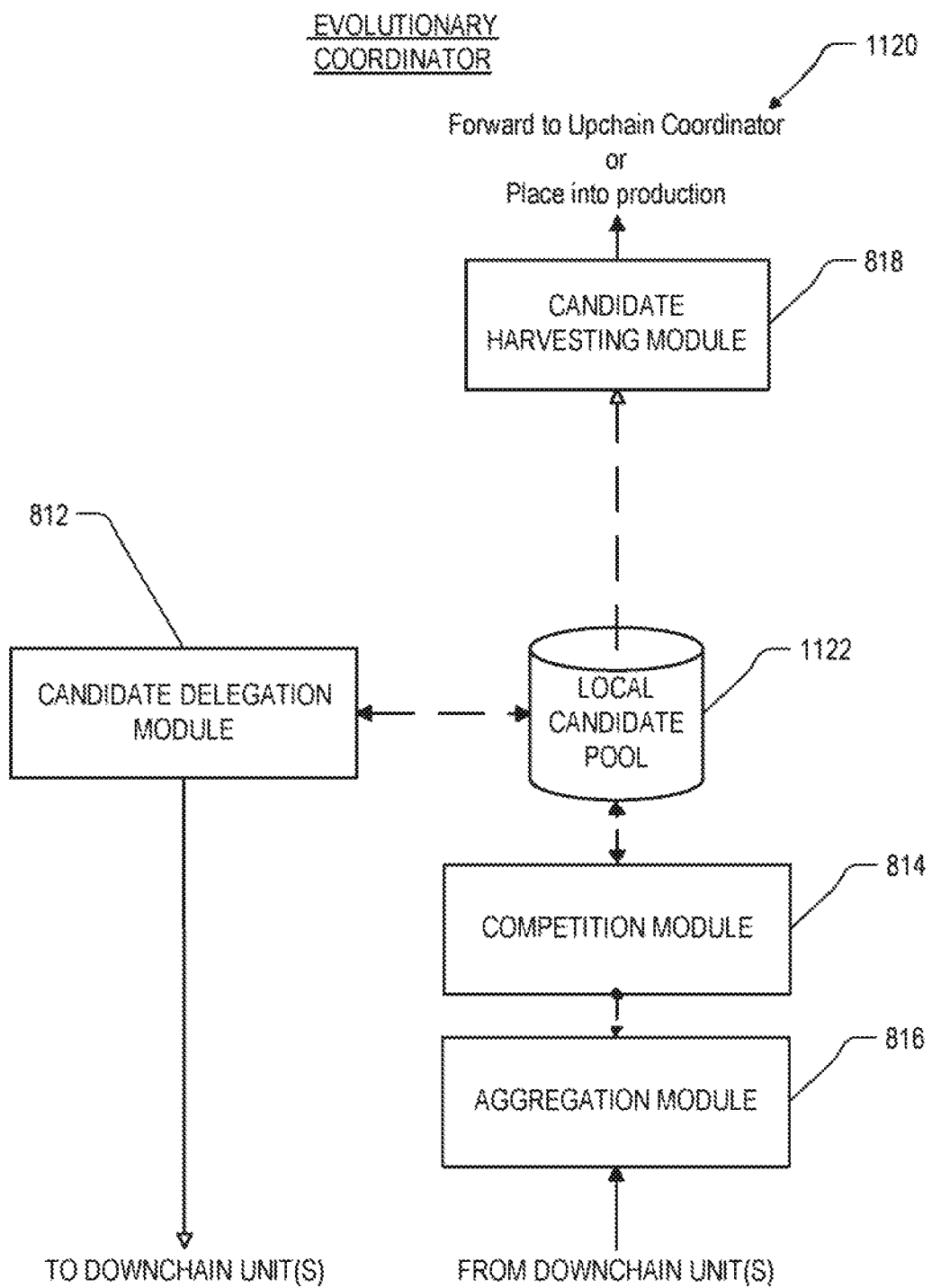
FIG. 8 illustrates various modules that can be used to implement the functionality of an evolutionary coordinator in a client/server configuration, according to an embodiment of the invention.
Figure 9:
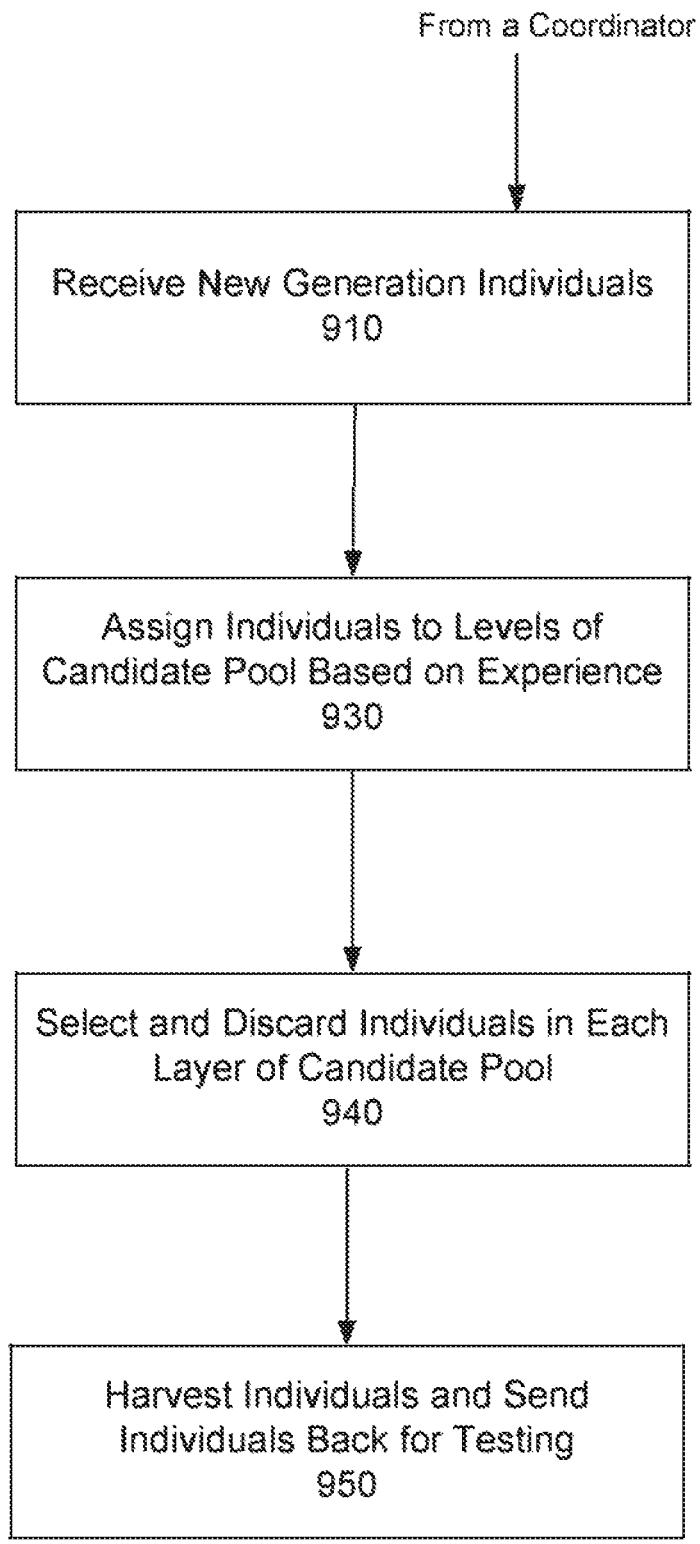
FIG. 9 is a flow diagram showing the basic operation of each evolutionary coordinator of the evolutionary mining system, according to an embodiment of the invention.

As mentioned, the term "evolutionary coordinator" includes both mid-chain evolutionary coordinators and the top-chain evolutionary coordinator. An evolutionary coordinator coordinates the testing and competition of individuals generated by one or more evolutionary engines. FIG. 8 is a block diagram showing structure of an evolutionary coordinator, according to an embodiment of the invention, and FIG. 9 is a flow diagram illustrating the operations performed by an evolutionary coordinator. The structure for a coordinator is similar to the structure of an evolutionary engine, though there are differences. An evolutionary coordinator performs a subset of the operations described above for an evolutionary engine. An evolutionary coordinator does not create or test individuals. A coordinator only compares individuals harvested from one or more evolutionary engines to select the best performing individuals across the evolutionary engines which it coordinates. The candidate pool for a coordinator may not have a layer 0 because only individuals from an elitist pool in a down-chain unit are promoted to a coordinator. An EC may use a different competition algorithm than that used in an evolutionary engine.

EC Receiving Individuals

In Step 910, new or returning individuals are received. For individuals new to the coordinator's candidate pool 1122 that have been harvested from a down-chain evolutionary unit, the aggregation module 816 records the individual's fitness estimate. Returning individuals that had previously been in the coordinator's candidate pool and were sent to a down-chain unit for more testing then sent back to the coordinator are received by the aggregation module 816, which updates the coordinator's view of the fitness estimate based on the recent testing results.

EC—Competition

In Step 930 a competition module 814 of the evolutionary coordinator assigns incoming individuals to a layer in the EC's local candidate pool based on the individual's experience level. In an embodiment, an individual returning to the coordinator after having been further tested may not have had its experience level increased sufficiently for it to qualify for a higher experience layer, in which case the individual is not yet considered for advancement within the local candidate pool. On the other hand, if the returned individual has had its experience level increased significantly, it may be considered for a layer that is two layers or more above the individual's prior layer in the local candidate pool.

Figure 10:
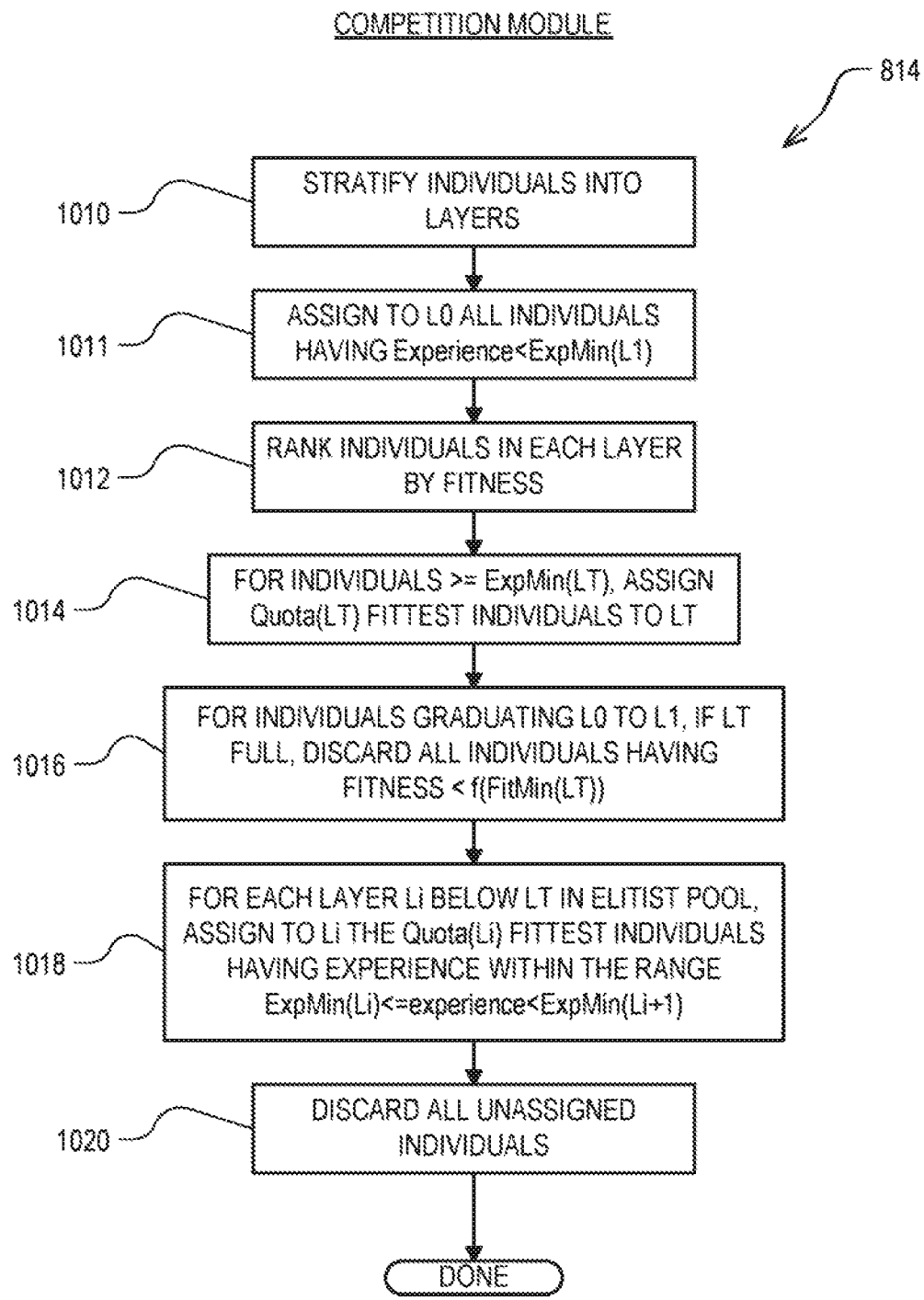
FIG. 10 is a flow diagram illustrating a method of operation of the competition modules for an evolutionary coordinator, according to an embodiment of the invention.

In an embodiment, Step 940 of deciding to discard an individual may occur in conjunction with assigning the individual to a layer. Thus, selecting individuals for discarding may be performed in a different way than described above for the evolutionary engine. The fitness of the individual may also be considered in discarding decisions. FIG. 10 illustrates a flow diagram showing the operations performed for discarding excess individuals in an evolutionary coordinator. In step 1010, the competition module stratifies individuals in the candidate pool in the EC into experience layers. In Step 1011 individuals having less experience than the minimum experience required to enter the elite pool are assigned to Layer 0. In step 1012, the individuals in each layer are ranked based on their fitness estimate. In Step 1014, individuals that have achieved at least the minimum experience required to be in the top layer of the elitist pool, keep only the quota number of the top ranked individuals. Individuals assigned to the top layer but don't make the cut are discarded in Step 1020.

A minimum fitness for the elitist pool may be initialized to zero. Once the top layer has reached its quota of individuals, the minimum fitness is assigned equal to the fitness of the least fit individual in the top layer. This minimum fitness may change as the population of the top layer changes. In Step 1016, individuals being promoted from Layer 0 into the first layer of the elitist pool may only enter the elitist pool if their fitness estimate is at least as good as the minimum fitness. Individuals with enough experience to qualify for the elitist pool are nevertheless discarded if their fitness estimate doesn't reach the required minimum. In an embodiment, same is true of individuals being seen by the EC for the first time.

In Step 1018, for all other layers, ($L_1$ through LT−i), keep within each layer the quota number of top individuals ranked by fitness estimate, and in Step 1020, discard the individuals in each layer that do not make the cut.

Thus in the embodiment of FIG. 10, in an evolutionary coordinator, individuals are discarded in dependence upon their fitness, and not their novelty.

EC—Sending Individuals for Further Testing

Returning to FIG. 9, In Step 950, individuals are selected for harvesting and individuals are selected for further testing. A coordinator includes a candidate delegation module 812 which forwards selected individuals from the coordinator's candidate pool a down-chain unit (which may be to an evolutionary engine) for further testing. When individuals are sent to an evolutionary engine for further testing, the individual also continues to compete based on its experience level and fitness within the evolutionary coordinator. If the individual is discarded by the coordinator during the time it is undergoing further testing, the updated experience and fitness information reported by the down-chain unit if and when the individual is returned, are ignored.

EC—Harvesting

Sometime after the top layer of the local candidate pool 1122 is full, candidate harvesting module 818 selects individuals to be forwarded to an up-chain evolutionary coordinator or for use in production. In one embodiment, individuals may be harvested from the entire elitist pool. In another embodiment, candidate harvesting module 818 selects only from the top layer LT in the local candidate pool 1122, and can apply further selection criteria as well in order to choose desirable individuals. For example, it can select only the fittest individuals from LT, and/or only those individuals that have shown low volatility. Other criteria will be apparent to the reader. Such criteria is usually specific to the application environment. The individuals also may undergo further validation as part of this further selection criteria, by testing on historical data not part of training data 114. The individuals selected by the candidate harvesting module 818 are removed from the local candidate pool and forwarded to the up-chain evolutionary coordinator (if the EC is a mid-chain EC) or written to the production population database 122 for use by production system 112 as previously described (if the EC is the top-chain EC).

Figure 12:
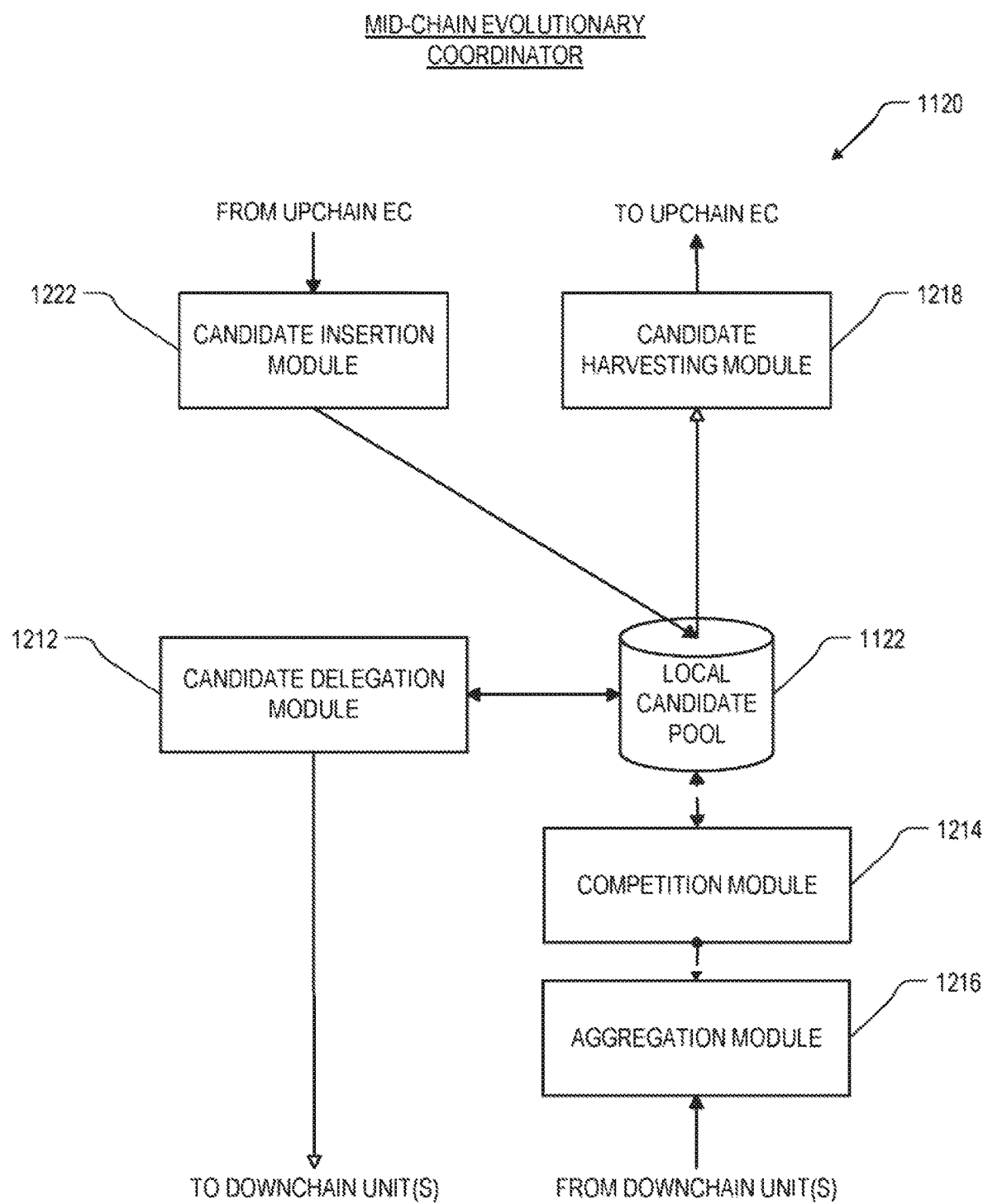
FIG. 12 illustrates various modules that can be used to implement the functionality of a mid-chain evolutionary coordinator of FIG. 11, according to an embodiment of the invention.

FIG. 12 illustrates various modules that can be used to implement the functionality of a mid-chain evolutionary coordinator of FIG. 11. A mid-chain coordinator has a similar structure to the coordinator illustrated in FIG. 8. The candidate delegation module 1222 and the candidate harvesting module 1218 may be the same as those described in FIG. 8. However, the candidate harvesting module 1218 for a mid-chain coordinator does not place individuals into production, but instead harvests individuals to send to another mid-chain coordinator or a top-chain coordinator.

As explained for a coordinator in FIG. 8, an aggregation module 1216 records and/or updates an incoming individual's fitness estimate and discards individuals from its local candidate pool that were discarded by an EE after testing. If the incoming individual is new to the coordinator and harvested from an engine down-chain, the incoming individual may compete for acceptance into the EC 1 120's local candidate pool 1122. The competition is performed by competition module 1214. As for the evolutionary engines 1130, the competition module 1214 also considers individuals from lower layers for promotion into higher layers in the local candidate pool 1122. Local candidate pool 1122 is updated with the revised contents.

Evolutionary coordinator 1120 also receives candidate individuals from its up-chain evolutionary coordinator 1110 or 1120 for further testing. These individuals are received by a candidate insertion module 1222 in the mid-chain EC 1120, but unlike when an evolutionary engine 1130 receives a new candidate, no testing of the new candidate will be performed on the coordinator itself, so the experience and fit estimate of the candidate is not subject to change. As a result, these individuals compete for entry into the EC's local candidate pool 1122 based on their associated experience and fitness. Received individuals arrive in conjunction with both their fitness estimates and their testing experience levels, and compete for entry into the EC 1 120's local candidate pool 1122 against only those individuals which occupy the same experience layer in the local candidate pool 1122. The candidate insertion module 1222 also takes a snapshot of the received individuals for returning to the up-chain engine if and when it returns the individual after testing. As for the evolutionary engines 1130, the received candidates retain their experience level and fitness estimates from above.

If one of the evolutionary engines 1120 or 1130 receives from its up-chain EC 1110 or 1120, an individual for evaluation which it is already in the process of evaluating, then the receiving evolutionary engine it simply ignores the delegation. The receiving engine knows what individuals it is evaluating because it maintains a list of them, and where they came from, even if it has since further delegated evaluation to other engines down-chain. Though the receiving engine has been told twice to evaluate the individual, the up-chain requestor will not be confused by receiving only one resulting report. The engine's report informs the up-chain requestor not only of the engine's testing results, but also the number of trials that the individual underwent under the control of the engine, and this information is used in the merging process performed by the requesting engine.

Sometime after the top layer of the local candidate pool 1122 is full, individuals can be harvested for forwarding to the EC's own up-chain EC. Candidate harvesting module 1218 retrieves individuals for that purpose. Preferably the candidate harvesting module 1218 maintains a list of individuals ready for reporting up. It awakens periodically, and forwards all the individuals on the list up-chain. As mentioned, candidate harvesting module 1218 preferably selects only from the layer or layers in the local candidate pool 1122 whose minimum experience levels are at least as high as the minimum experience level of the lowest layer ($L_1$) maintained by the immediately up-chain EC 1110 or 1120 (or only from among those individuals with at least as high an experience level). Candidate harvesting module 1218 also can apply further selection criteria as well in order to choose desirable individuals. If the individuals had previously been received from the up-chain EC for testing, then candidate harvesting module 1218 also forwards the snapshot that it took of the individual upon receipt.

Figure 13:
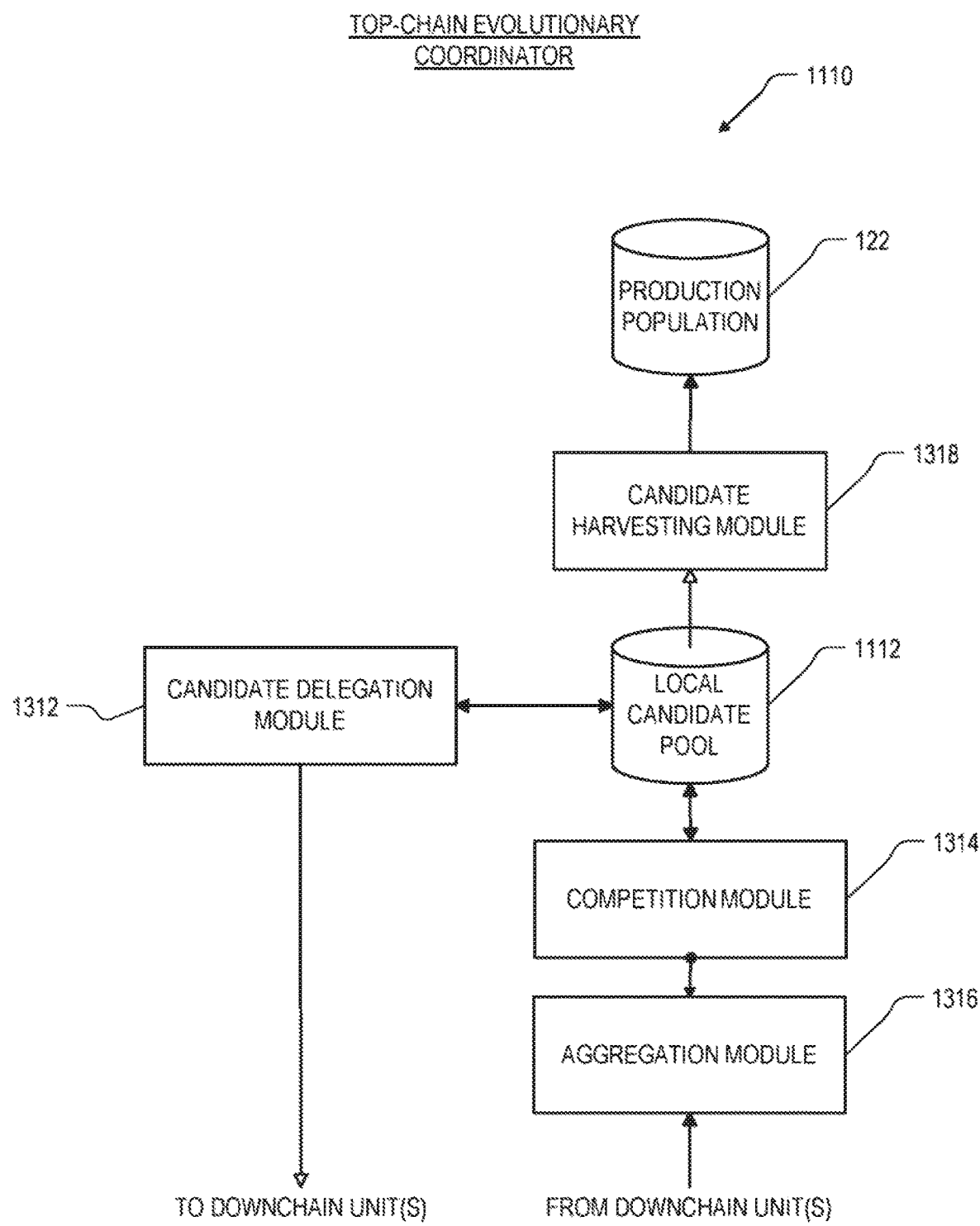
FIG. 13 illustrates various modules that can be used to implement the functionality of a top-chain evolutionary coordinator of FIG. 11, according to an embodiment of the invention.

FIG. 13 illustrates various modules that can be used to implement the functionality of a top-chain evolutionary coordinator 1110. The top-chain EC's local candidate pool 1112 is also shown in the drawing, as is the production population database 122. Most of the modules shown in FIG. 13 can in some embodiments operate asynchronously from each other.

As with the evolutionary engines 1130 and mid-chain evolutionary coordinators 1120, the top-chain evolutionary coordinator 1110 also implements a local layered candidate pool as described above with respect to FIG. 2. Again the number of layers in the elitist pool, and the minimum and maximum experience levels of such layers, need not be the same as any or all of the down-chain engines. Preferably, though, they span a generally higher set of experience levels than all the immediately down-chain engines. Like the mid-chain EC's 1120, top-chain EC 1110 does not maintain any individuals in $L_0$, though it does prevent further testing of individuals in its top layer $L_T$.

More specifically, the local candidate pool 1112 has multiple experience layers from its lowers layer $L_1$ to its highest layer $L_T$. Typically $L_1$ of the top-chain EC 1110 has a testing experience range who's minimum experience level is higher than that of $L_1$ of each of the mid-chain EC's 1120, though it could be equal in another embodiment. Individuals are harvested from only LT of the top-chain EC 1110.

The modules in the top-chain evolutionary coordinator 1110 are similar to those in the mid-chain EC's 1120, except there is no candidate insertion module for inserting any individuals received from any up-chain neighbor. Instead, all individuals in the local candidate pool 1112 were reported up from below.

Referring to FIG. 13, the candidate pool 1112 receives individuals from the EC's down-chain engines. Top-chain evolutionary coordinator 1110 does not perform any of its own testing of candidate individuals, but instead coordinates the testing performed by the down-chain engines. Thus top-chain EC 1110 includes a candidate delegation module 1312 which selects individuals from its local candidate pool 1112 for further testing. The candidate delegation module 1312 selects the individuals using any algorithm which tries to increase the experience level of all the individuals in the local candidate pool 1112 other than those in the top layer $L_T$. The candidate delegation module 1312 does not need to actively load-balance its down-chain engines, since it only sends individuals down to a down-chain engine in response to a request from the down-chain engine for more individuals to test.

Candidates being reported up from below are received by an aggregation module 1316. Similarly as described above for the mid-chain engines 1120, once the top-chain evolutionary coordinator 1110 sends a candidate to a down-chain engine, the down-chain engine is required to report it back, even if the candidate failed a competition below and was discarded. Thus candidates received by aggregation module 1316 are either individuals that failed below, in which case the top-chain EC 1110 discards the individual from its own local candidate pool 1112, or individuals that survived their tests below and are among the fittest individuals that were in the down-chain engine's local candidate pool. Of the latter type, some may be returns of individuals that the top-chain EC 1110 had previously sent down for further testing, and others may have originated from a down-chain EE 1130. If an individual is a return of one that the top-chain EC 1110 had previously sent down for further testing, then the aggregation module 1316 aggregates the contribution that such further testing makes to the overall EC-centric fitness estimate before considering it for acceptance in to the top-chain EC 1110's local candidate pool 1112. The aggregation methodology described above for the mid-chain EC's 1120 can be used for the top-chain EC 1110 as well.

If the returned individual is either a new individual that originated below, or a returned individual that is proposed for acceptance into the top-chain EC 1110's local candidate pool 1112, the individual is required to compete for its place in the EC 1110's local candidate pool 1112.

The competition is performed by competition module 1314. As for the evolutionary engines 1130 and mid-chain evolutionary coordinators 1120, the competition module 1314 considers individuals from lower layers for promotion into higher layers in the local candidate pool 1112. An evolutionary coordinator 1120 may discard individuals that do not meet the minimum individual fitness of their target layer, and discard individuals that have been replaced in a layer by new entrants into that layer. Local candidate pool 1112 is updated with the revised contents.

Note that because the evolutionary engines 1130 are volunteer contributors to the system, they may go offline or lose communication with their up-chain engines at any time. This may also be true of some mid-chain EC's 1120 in some embodiments. Thus it is possible that some individuals that an EC 1110 or 1120 sent down-chain for further testing will never be returned to the sending EC. In this case the prior copy of the individual, retained by the EC, remains in place in its local candidate pool unless and until it is displaced through competition in the EC. Still further, note that an individual retained in an EC after it has also been sent to a down-chain engine for further testing, may become displaced and discarded from the EC through competition in the EC. In this case, if the same individual is returned by the down-chain engine, the EC simply ignores it.

Example Sequence

Given the above principles, the following is an example sequence of steps that might occur in the arrangement of FIG. 11 as individuals are created, tested, subjected to competition, evolved, and eventually harvested. Many steps are omitted as the system operates on numerous individuals and numerous evolutionary not mentioned herein. Many steps are omitted also in between the steps set forth, for purposes of clarity. In addition, for purposes of clarity several of the evolutionary engines in FIG. 11 are referred to by shorthand abbreviations EC1, EC2, EC4, EE2, EE3, EE4, EE5, EE6 and TEC, all as indicated in FIG. 11.

EE2 creates candidates, including Individual #1, writes to local candidate pool

EE2 tests the candidates in local candidate pool, including discarding some through local competition, procreating to make new candidates, and creating new candidates randomly. The local competition in EE2 specifically favors novelty of individuals, not fitness, though fitness may be used in the so-called tie-breaker role mentioned above.

Individual #1 reaches top layer in local candidate pool

EE2 transmits candidates from top layer, including Individual #1 and EE2's view of Individual #1's fitness level, to mid-chain EC1

EC1 accepts Individual #1 after competition against other candidates in EC 1's local candidate pool. EC 1's view of Individual #1's fitness level is now equal to EE2's view of Individual #1's fitness level. EC1 writes Individual #1 into L1 of local candidate pool with EC 1's view of Individual #1's fitness level. Competition in EC I favors fitness of individuals.

EC I receives request from EE2 for candidates to test.

EC1 transmits candidates, including Individual #1, to EE2 for further testing.

EE2 inserts Individual #1 into EE2's local candidate pool.

EE2 tests the candidates in its local candidate pool, including Individual #1, including discarding some through local competition (favoring novelty), procreating to make new candidates, and creating new candidates randomly. Individual #1 survives the competition.

Before receiving back Individual #1 from EE2, EC1 receives request from EE3 for candidates to test.

EC1 transmits candidates, again including Individual #1, to EE3 for further testing.

EE3 inserts Individual #1 into EE3's local candidate pool.

EE3 tests the candidates in its local candidate pool, including Individual #1, including discarding some through local competition (favoring novelty), procreating to make new candidates, and creating new candidates randomly. Individual #1 survives.

Individual #1 reaches top layer in EE2's local candidate pool.

EE2 transmits candidates from top layer, including Individual #1, to ECI with its own view of Individual #1's updated fitness level.

ECI accepts Individual #1 after competition (favoring fitness) against other candidates in EC 1's local candidate pool. Writes Individual #1 into experience-appropriate layer of local candidate pool. Merges EE2's view of Individual #1's fitness level with EC 1's view and writes updated view of Individual #1's fitness level into EC 1's local candidate pool.

Individual #1 reaches top layer in EE3's local candidate pool

EE3 transmits candidates from top layer, including Individual #1, to ECI with its own view of Individual #1's updated fitness level.

ECI accepts Individual #1 after competition (favoring fitness) against other candidates in EC 1's local candidate pool. Writes Individual #1 into experience-appropriate layer of local candidate pool. Merges EE3's view of Individual #1's fitness level with EC 1's view and writes updated view of Individual #1's fitness level into EC 1's local candidate pool.

EC I sends request to top-chain TEC for candidates to test.

TEC transmits candidates, including Individual #2, to ECI for further testing.

ECI accepts Individual #2 after competition (favoring fitness) against other candidates in EC 1's local candidate pool.

ECI continues to coordinate further testing of the candidates in its local candidate pool, including Individual #I and Individual #2, including delegating testing of Individual #I and/or Individual #2 to EE2 and/or EE3, receiving them back after testing with new fitness estimates as viewed by EE2 and/or EE3, and discarding some through local competition (favoring fitness) with other candidates in EC 1's local candidate pool.

Individual #1 and Individual #2 reach top layer in EC 1's local candidate pool.

ECI transmits candidates from top layer, including Individual #1 and Individual #2, to TEC with EC 1's view of Individual #1's and Individual #2's updated fitness levels.

TEC accepts Individual #1 and Individual #2 after competition (favoring fitness) against other candidates in TEC local candidate pool. Writes Individual #1 and Individual #2 into LI of local candidate pool. Merges EC 1's view of Individual #2's fitness level with TEC's view and writes updated view of Individual #2's fitness level into TEC's local candidate pool. Since Individual #1 is new to TEC, TEC's view of Individual #1's fitness level is now equal to EC 1's view of Individual #1's fitness level.

Mid-chain EC2 sends request to top-chain TEC for candidates to test.

TEC transmits candidates, including Individual #1, to EC2 for further testing.

EC2 accepts Individual #1 after competition (favoring fitness) against other candidates in EC2's local candidate pool.

Mid-chain EC4 sends request to EC2 for candidates to test.

EC2 transmits candidates, including Individual #1, to EC4 for further testing.

EC4 accepts Individual #1 after competition (favoring fitness) against other candidates in EC4's local candidate pool.

EE5 sends request to EC4 for candidates to test.

EE5 transmits candidates, including Individual #1, to EE5 for further testing.

EE5 inserts Individual #1 into EE5's local candidate pool.

EE5 tests the candidates in its local candidate pool, including Individual #1, including discarding some through local competition (favoring novelty), procreating to make new candidates, and creating new candidates randomly.

Individual #1 reaches top layer of EE5's local candidate pool.

EE5 transmits candidates from top layer, including Individual #1, to EC4 with its own view of Individual #1's updated fitness level.

EC4 accepts Individual #1 after competition (favoring fitness) against other candidates in EC4's local candidate pool. Merges EES's view of Individual #1's fitness level with EC4's view and writes updated view of Individual #1's fitness level into EC4's local candidate pool.

EC4 continues to coordinate further testing of the candidates in its local candidate pool, including Individual #1, including delegating testing of Individual #1 to EE5 and/or EE6, receiving them back after testing with new fitness estimates as viewed by EE5 and/or EE6, and discarding some through local competition (favoring fitness) with other candidates in EC4's local candidate pool.

Individual #1 reaches top layer in EC4's local candidate pool.

EC4 transmits candidates from top layer, including Individual #1, to EC2 with EC4's view of Individual #1's updated fitness levels.

EC2 accepts Individual #1 after competition (favoring fitness) against other candidates in EC2's local candidate pool. Writes Individual #1 into appropriate layer of local candidate pool. Merges EC4's view of Individual #1's fitness level with EC2's view and writes updated view of Individual #1's fitness level into EC2's local candidate pool.

EC2 continues to coordinate further testing of the candidates in its local candidate pool, including Individual #1, including delegating testing of Individual #1 to EE4 and/or EC4, receiving them back after testing with new fitness estimates as viewed by EE4 and/or EC4, and discarding some through local competition (favoring fitness) with other candidates in EC2's local candidate pool.

EC2 transmits candidates from top layer, including Individual #1, to TEC with EC2's view of Individual #1's updated fitness levels.

TEC accepts Individual #1 after competition (favoring fitness) against other candidates in TEC's local candidate pool. Writes Individual #1 into experience-appropriate layer of local candidate pool. Merges EC2's view of Individual #1's fitness level with TEC's view and writes updated view of Individual #1's fitness level into TEC's local candidate pool.

Individual #1 reaches top layer in TEC's local candidate pool.

Individual #1 is harvested for production population.

It will be appreciated that where4as in embodiments described herein only the evolutionary engines cause their individuals to complete on novelty whereas all of the evolutionary coordinators cause their individuals to complete on fitness, in another embodiment some of the evolutionary coordinators can cause their individuals to compete at least in part based on novelty as well.

Computer Hardware

Figure 14:
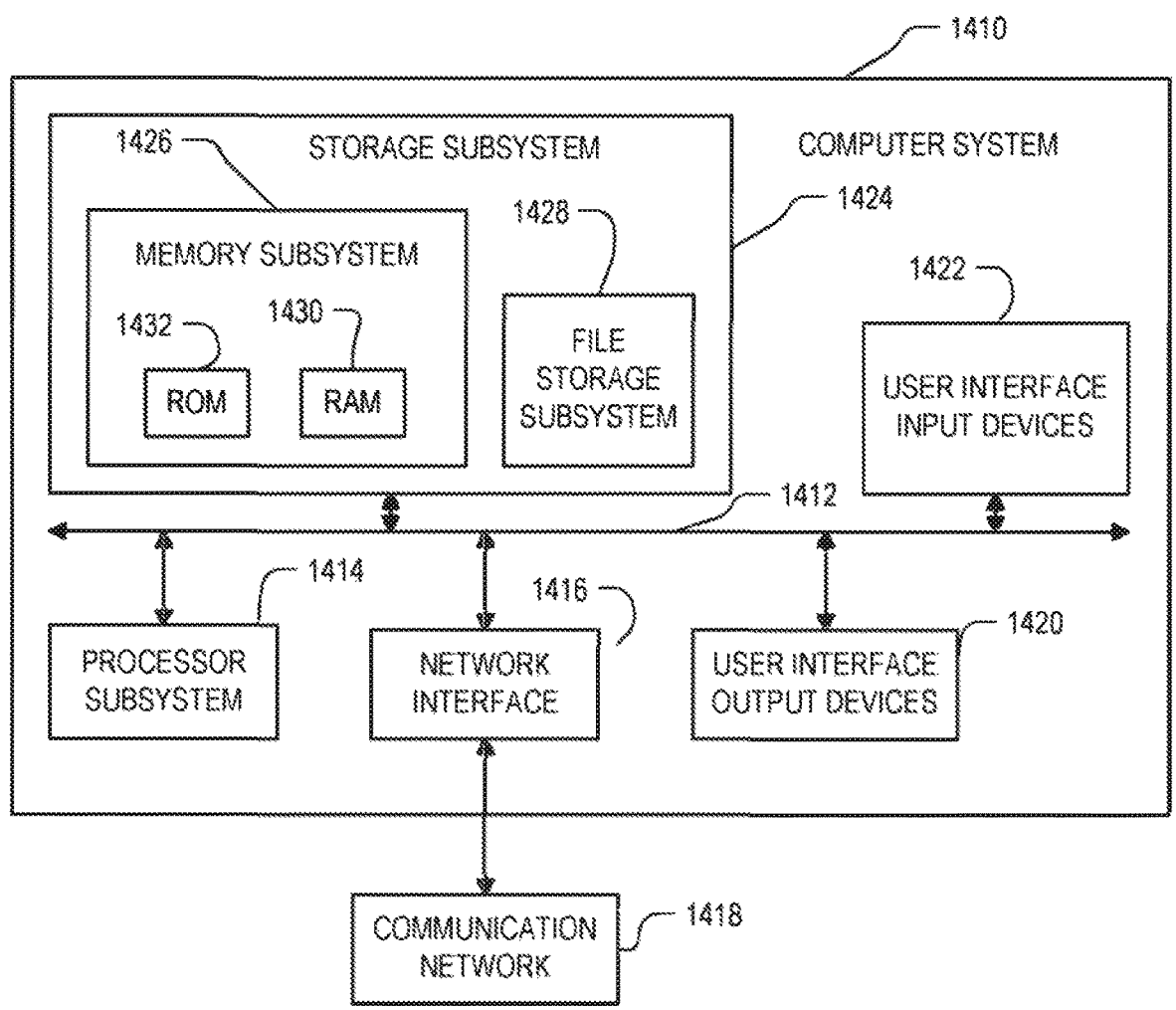
FIG. 14 is a simplified block diagram of a computer system that can be used to implement any or all of the evolutionary units, the production system, and the data feed server in FIGS. 1 and 11, according to an embodiment of the invention.

FIG. 14 is a simplified block diagram of a computer system 1410 that can be used to implement any or all of the evolutionary engines 1110, 1120, and I 130, the production system 112, and the data feed server 1140. While FIGS. 5, 8, 12, and 13 indicate individual components for carrying out specified operations, it will be appreciated that each component actually causes a computer system such as 1410 to operate in the specified manner.

Computer system 1410 typically includes a processor subsystem 1414 which communicates with a number of peripheral devices via bus subsystem 1412. These peripheral devices may include a storage subsystem 1424, comprising a memory subsystem 1426 and a file storage subsystem 1428, user interface input devices 1422, user interface output devices 1420, and a network interface subsystem 1416. The input and output devices allow user interaction with computer system 1410. Network interface subsystem 1416 provides an interface to outside networks, including an interface to communication network 1418, and is coupled via communication network 1418 to corresponding interface devices in other computer systems. For the evolutionary engines 1110, 1120, and 1130, communication with the engine's up-chain and down-chain engines occurs via communication network 1418. Communication network 1418 may comprise many interconnected computer systems and communication links. These communication links may be wireline links, optical links, wireless links, or any other mechanisms for communication of information. While in one embodiment, communication network 1418 is the Internet, in other embodiments, communication network 1418 may be any suitable computer network or combination of computer networks.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1422 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1410 or onto computer network 1418.

User interface output devices 1420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1410 to the user or to another machine or computer system. In particular, an output device of the computer system 1410 on which production system 112 is implemented, may include a visual output informing a user of action recommendations made by the system, or may include a communication device for communicating action signals directly to the controlled system 128. Additionally or alternatively, the communication network 1418 may communicate action signals to the controlled system 128. In the financial asset trading environment, for example, the communication network 1418 transmits trading signals to a computer system in a brokerage house which attempts to execute the indicated trades.

Storage subsystem 1424 stores the basic programming and data constructs that provide the functionality of certain embodiments of the present invention. For example, the various modules implementing the functionality of certain embodiments of the invention may be stored in storage subsystem 1424. These software modules are generally executed by processor subsystem 1414. Storage subsystem 1424 also stores the candidate pools 1112, 1122, or 1132, as the case may be, for a respective evolutionary engine. For the data feed 1140 storage subsystem 1424 may store the training database 114. For the top-chain EC 1110 and/or for production system 112, storage subsystem 1424 may store the production population 122. Alternatively, one or more of such databases can be physically located elsewhere, and made accessible to the computer system 1410 via the communication network 1418.

Memory subsystem 1426 typically includes a number of memories including a main random access memory (RAM) 1430 for storage of instructions and data during program execution and a read only memory (ROM) 1432 in which fixed instructions are stored. File storage subsystem 1428 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1428. The host memory 1426 contains, among other things, computer instructions which, when executed by the processor subsystem 1414, cause the computer system to operate or perform functions as described herein. As used herein, processes and software that are said to run in or on "the host" or "the computer", execute on the processor subsystem 1414 in response to computer instructions and data in the host memory subsystem 1426 including any other local or remote storage for such instructions and data.

As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Bus subsystem 1412 provides a mechanism for letting the various components and subsystems of computer system 1410 communicate with each other as intended. Although bus subsystem 1412 is shown schematically as a single bus, alternative embodiments of the bus subsystem may use multiple busses.

Computer system 1410 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1410 depicted in FIG. 14 is intended only as a specific example for purposes of illustrating the preferred embodiments of the present invention. Many other configurations of computer system 1410 are possible having more or less components than the computer system depicted in FIG. 14.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. For example, though embodiments described herein use experience-layered candidate pools, candidate pools used in other embodiments need not be experience-layered. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. An arrangement of processing units, for use with a data mining training database containing training data, comprising:
    a first processing unit having a first processor and a first memory, the first memory storing a first local pool of candidate individuals, each of the candidate individuals in the first local pool identifying at least one classification rule and further identifying a respective fitness estimate centric to the first processing unit; and
    a second processing unit disposed down-chain of the first processing unit, the second processing unit having a second processor and a second memory, the second memory storing a second local pool of candidate individuals, each of the candidate individuals in the second local pool identifying at least one classification rule and further identifying a respective fitness estimate centric to the second processing unit,
    wherein the first processor is configured to:
        store in the first memory individuals for evaluation against portions of the training data,
        delegate, to the second processing unit, evaluation of individuals from the first local pool of candidate individuals,
        update the fitness estimates, centric to the first processing unit, for selected ones of individuals received back from the second processing unit after testing, in dependence upon results of such testing, and
        select individuals for discarding from the first local pool, in dependence upon their fitness estimates relative to the fitness estimates of the other individuals within the first local pool, and wherein the second processor is configured to:
        store in the second local pool of candidate individuals, individuals received by the second processing unit from the first processing unit for evaluation,
        test individuals from the second local pool of candidate individuals against a portion of the training data,
        update the fitness estimates, centric to the second processing unit, for selected ones of individuals tested, in dependence upon the results of such testing,
        select individuals for discarding from the second local pool, in dependence upon their novelty relative to other individuals in the second local pool, and
        report to the first processing unit, individuals from the second local pool and not selected for discarding, in conjunction with the individuals' fitness estimates, centric to the second processing unit;
    wherein testing individuals from the second local pool of candidate individuals against a portion of the training data, includes recording, for each individual tested, an identification of the behavior of the individual when tested against the portion of the training data,
    and wherein selecting individuals for discarding from the second local pool in dependence upon their novelty relative to other individuals in the second local pool comprises iteratively:
        identifying, among the individuals in at least a non-null subset of the individuals in the second local pool, the pair whose recorded behavior is most similar; and
        selecting one individual of the identified pair for discarding.

2. The arrangement of claim 1, wherein selecting individuals for discarding from the second local pool in dependence upon their novelty relative to other individuals in the second local pool, is performed further in dependence upon their fitness estimates relative to other individuals in the second local pool.

3. The arrangement of claim 1, wherein selecting one individual of the identified pair for discarding comprises selecting for discarding the individual of the identified pair having a lower fitness estimate, centric to the second processing unit.

4. The arrangement of claim 1, wherein the second processor is further configured to add into the second local pool individuals developed by reproduction in dependence upon parent individuals remaining in the second local pool after the selecting individuals for discarding from the second local pool.

5. A computer system which transmits toward a second processing unit, software which, when executed by a second processor performs:
   storing in a second local pool of candidate individuals, individuals received by the second processing unit from a first processing unit for evaluation,
   testing individuals from the second local pool of candidate individuals against a portion of training data,
   updating fitness estimates, centric to the second processing unit, for selected ones of individuals tested, in dependence upon results of such testing,
   selecting individuals for discarding from the second local pool, in dependence upon their novelty relative to other individuals in the second local pool, and
   reporting toward the first processing unit, individuals from the second local pool and not selected for discarding, in conjunction with the individuals' fitness estimates, centric to the second processing unit;
   wherein testing individuals from the second local pool of candidate individuals against a portion of the training data, includes recording, for each individual tested, an identification of the behavior of the individual when tested against the portion of the training data, and wherein selecting individuals for discarding from the second local pool in dependence upon their novelty relative to other individuals in the second local pool comprises iteratively:
      identifying, among the individuals in at least a non-null subset of the individuals in the second local pool, the pair whose recorded behavior is most similar; and
      selecting one individual of the identified pair for discarding.

6. The computer system of claim 5, which further transmits toward the first processing unit having a first processor, software which, when executed by the first processor performs:
   storing in a first memory individuals for evaluation against portions of the training data, delegating, to the second processing unit, evaluation of individuals from a first local pool of candidate individuals,
   updating fitness estimates, centric to the first processing unit, for selected ones of individuals received back from the second processing unit after testing, in dependence upon the results of such testing, and
   selecting individuals for discarding from the first local pool, in dependence upon their fitness estimates relative to the fitness estimates of the other individuals within the first local pool.

7. The computer system of claim 5, wherein selecting individuals for discarding from the second local pool in dependence upon their novelty relative to other individuals in the second local pool, is performed further in dependence upon their fitness estimates relative to other individuals in the second local pool.

8. The computer system of claim 5, wherein selecting one individual of the identified pair for discarding comprises selecting for discarding the individual of the identified pair having a lower fitness estimate, centric to the second processing unit.

9. The computer system of claim 5, wherein the second processor is further configured to add into the second local pool individuals developed by reproduction in dependence upon parent individuals remaining in the second local pool after the selecting individuals for discarding from the second local pool.

10. An evolutionary engine for use with a data mining training database containing training data, and for use further with an evolutionary coordinator having a pool of candidate individuals stored accessibly thereto, the evolutionary engine comprising:
    a processor and a memory, the memory storing accessibly to the processor a local pool of candidate individuals, each of the candidate individuals in the local pool identifying at least one classification rule and further identifying a respective fitness estimate centric to the evolutionary engine,
    wherein the processor is configured to:
       store in the local pool, individuals received by the evolutionary engine from the evolutionary coordinator for evaluation,
       test individuals from the local pool against a portion of the training data,
       update the fitness estimates, centric to the evolutionary engine, for selected ones of individuals tested, in dependence upon the results of such testing,
       select individuals for discarding from the local pool, in dependence upon their novelty relative to other individuals in the local pool, and
       report toward the evolutionary coordinator individuals from the local pool and not selected for discarding, in conjunction with the individuals' fitness estimates centric to the evolutionary coordinator;
    wherein in testing individuals from the local pool of candidate individuals against a portion of the training data, the processor is configured to record, for each individual tested, an identification of the behavior of the individual when tested against the portion of the training data, and wherein in selecting individuals for discarding from the local pool in dependence upon their novelty relative to other individuals in the local pool the processor is configured to iteratively:
       identify, among the individuals in at least a non-null subset of the individuals in the local pool, the pair whose recorded behavior is most similar; and
       select one individual of the identified pair for discarding.

11. The evolutionary engine of claim 10, wherein in selecting individuals for discarding from the local pool in dependence upon their novelty relative to other individuals in the local pool, the processor is configured to select the individuals for discarding further in dependence upon their fitness estimates relative to other individuals in the local pool.

12. The evolutionary engine of claim 10, wherein in selecting one individual of the identified pair for discarding the processor is configured to select for discarding the individual of the identified pair having a lower fitness estimate, centric to the evolutionary engine.

13. The evolutionary engine of claim 10, wherein the processor is further configured to add into the local pool individuals developed by reproduction in dependence upon parent individuals remaining in the local pool after the selecting individuals for discarding from the local pool.

14. The evolutionary engine of claim 10, wherein in selecting individuals for reporting, the processor is configured to select the individuals for reporting in dependence upon the fitness estimates of the individuals centric to the evolutionary engine, from among the individuals in the local pool not yet selected for discarding.

\* \* \* \* \*